(12) United States Patent
Tang et al.

(10) Patent No.: US 10,848,681 B2
(45) Date of Patent: Nov. 24, 2020

(54) IMAGE RECONSTRUCTION FROM IMAGE SENSOR OUTPUT

(71) Applicant: Facebook Technologies, LLC, Menlo Park, CA (US)

(72) Inventors: Huixuan Tang, Redmond, WA (US); Song Chen, Redmond, WA (US); Xinqiao Liu, Medina, WA (US)

(73) Assignee: FACEBOOK TECHNOLOGIES, LLC, Menlo Park, CA (US)

(*) Notice: Subject to any disclaimer, the term of this patent is extended or adjusted under 35 U.S.C. 154(b) by 0 days.

(21) Appl. No.: 16/386,215

(22) Filed: Apr. 16, 2019

(65) Prior Publication Data

US 2019/0320105 A1 Oct. 17, 2019

Related U.S. Application Data

(60) Provisional application No. 62/659,081, filed on Apr. 17, 2018.

(51) Int. Cl.
*H04N 5/235* (2006.01)
*H04N 9/04* (2006.01)

(52) U.S. Cl.
CPC ....... *H04N 5/2351* (2013.01); *H04N 9/04515* (2018.08)

(58) Field of Classification Search
CPC .................. G01R 33/5611; G01R 33/3415; G01R 33/34; G01R 33/34046; G01R 33/34076;
(Continued)

(56) References Cited

U.S. PATENT DOCUMENTS

| 8,134,623 B2 | 3/2012 | Purcell et al. |
| 8,687,497 B2 * | 4/2014 | Sands .................... H04B 3/487 370/236 |

(Continued)

FOREIGN PATENT DOCUMENTS

| EP | 1746820 A1 | 1/2007 |
| WO | 2009142641 A1 | 11/2009 |

OTHER PUBLICATIONS

U.S. Appl. No. 15/847,517, "Non-Final Office Action", dated Nov. 23, 2018, 21 pages.
(Continued)

*Primary Examiner* — Dave Czekaj
*Assistant Examiner* — Kehinde Abimbola
(74) *Attorney, Agent, or Firm* — Kilpatrick Townsend & Stockton LLP

(57) ABSTRACT

Methods and systems for reconstructing images from sensor data are provided. In one example, a method comprises: receiving input data generated by photodiodes each associated with a channel having a target wavelength range for photon-to-charge conversion; obtaining, for each channel, a plurality of channel coefficients, the plurality of channel coefficients being configured to, when combined with the input data to generate channel output data for the each channel, increase a main component of the channel output data contributed by a part of the incident light within the target wavelength range of the each channel with respect to a crosstalk component of the channel output data contributed by a part of the incident light out of the target wavelength range; and generating, for the each channel, the channel output data based on combining the input data with the plurality of channel coefficients to reconstruct an image for the each channel.

20 Claims, 19 Drawing Sheets

(58) Field of Classification Search
CPC .............. G01R 33/3628; G01R 33/543; G01R 33/5608; G01R 33/5614; G01R 33/56308; G01R 33/56325; G01R 33/5673; G01J 1/4228

See application file for complete search history.

(56) References Cited

U.S. PATENT DOCUMENTS

| | | | |
|---|---|---|---|
| 8,779,346 | B2 | 7/2014 | Fowler et al. |
| 9,094,629 | B2 | 7/2015 | Ishibashi |
| 9,363,454 | B2 | 6/2016 | Ito et al. |
| 9,490,872 | B2* | 11/2016 | Sands ................ H04B 3/487 |
| 2003/0020100 | A1 | 1/2003 | Guidash |
| 2005/0057389 | A1 | 3/2005 | Krymski |
| 2006/0175531 | A1* | 8/2006 | DiCarlo ............. H04N 17/002 250/208.1 |
| 2007/0076481 | A1 | 4/2007 | Tennant |
| 2007/0102740 | A1 | 5/2007 | Ellis-Monaghan et al. |
| 2007/0222881 | A1 | 9/2007 | Mentzer |
| 2009/0324013 | A1* | 12/2009 | Tanaka ................. G06T 7/246 382/103 |
| 2010/0276572 | A1 | 11/2010 | Iwabuchi et al. |
| 2011/0110409 | A1* | 5/2011 | Sands ................ H04B 3/487 375/222 |
| 2011/0142111 | A1* | 6/2011 | Sands ................ H04M 11/062 375/222 |
| 2011/0254986 | A1 | 10/2011 | Nishimura et al. |
| 2012/0133807 | A1 | 5/2012 | Wu et al. |
| 2012/0262616 | A1 | 10/2012 | Sa et al. |
| 2013/0056809 | A1 | 3/2013 | Mao et al. |
| 2013/0057742 | A1 | 3/2013 | Nakamura et al. |
| 2013/0141619 | A1 | 6/2013 | Lim et al. |
| 2013/0207219 | A1 | 8/2013 | Ahn |
| 2013/0299674 | A1 | 11/2013 | Fowler et al. |
| 2013/0301924 | A1* | 11/2013 | Chen ................. G06K 9/0063 382/191 |
| 2014/0021574 | A1 | 1/2014 | Egawa |
| 2014/0042299 | A1 | 2/2014 | Wan et al. |
| 2014/0211936 | A1* | 7/2014 | Sands ................ H04B 3/487 379/406.08 |
| 2015/0189209 | A1 | 7/2015 | Yang et al. |
| 2015/0279884 | A1 | 10/2015 | Kusumoto |
| 2015/0312502 | A1 | 10/2015 | Borremans |
| 2016/0028974 | A1 | 1/2016 | Guidash et al. |
| 2016/0088253 | A1 | 3/2016 | Tezuka |
| 2016/0100115 | A1 | 4/2016 | Kusano |
| 2016/0111457 | A1 | 4/2016 | Sekine |
| 2016/0165160 | A1 | 6/2016 | Hseih et al. |
| 2016/0204150 | A1 | 7/2016 | Oh et al. |
| 2016/0337605 | A1 | 11/2016 | Ito |
| 2016/0360127 | A1 | 12/2016 | Dierickx et al. |
| 2017/0094210 | A1* | 3/2017 | Galor Gluskin ..... H04N 5/3696 |
| 2018/0131862 | A1* | 5/2018 | Galor Gluskin .......... G06T 7/11 |
| 2018/0217390 | A1* | 8/2018 | Zha ....................... G02B 6/0048 |

OTHER PUBLICATIONS

Cho, et al., "A Low Power Dual CDS for a Column-Parallel CMOS Image Sensor", Journal of Semiconductor Technology and Science, vol. 12, No. 4, Dec. 30, 2012, pp. 388-396.
European Application No. EP18179838.0, "Partial European Search Report", dated Dec. 5, 2018, 14 pages.
European Application No. EP18179846.3, "Extended European Search Report", dated Dec. 7, 2018, 10 pages.
European Application No. EP18179851.3, "Extended European Search Report", dated Dec. 7, 2018, 8 pages.
International Application No. PCT/US2018/039350, "International Search Report and Written Opinion", dated Nov. 15, 2018, 13 pages.
International Application No. PCT/US2018/039352, "International Search Report and Written Opinion", dated Oct. 26, 2018, 10 pages.
International Application No. PCT/US2018/039431, "International Search Report and Written Opinion", dated Nov. 7, 2018, 14 pages.
International Application No. PCT/US2018/064181, "International Search Report and Written Opinion", dated Mar. 29, 2019, 12 pages.
Hertel et al., A Low-Cost VIS-NIR True Color Night Vision Video System Based on a Wide Dynamic Range CMOS Imager, Intelligent Vehicles Symposium, Institute of Electrical and Electronics Engineers, XP031489853, Jun. 3, 2009, pp. 273-278.
Park et al., Color Restoration of RGBN Multi spectral Filter Array Sensor Images Based on Spectral Decomposition, Sensors, vol. 16, No. 5, XP055306617, May 18, 2016, 26 pages.
International Application No. PCT/US2019/027916, International Search Report and Written Opinion dated Jul. 1, 2019, 11 pages.
Tang et al., High Resolution Photography with an RGB-Infrared Camera, Institute of Electrical and Electronics Engineers International Conference on Computational Photography, Apr. 24, 2015, 10 pages.

* cited by examiner

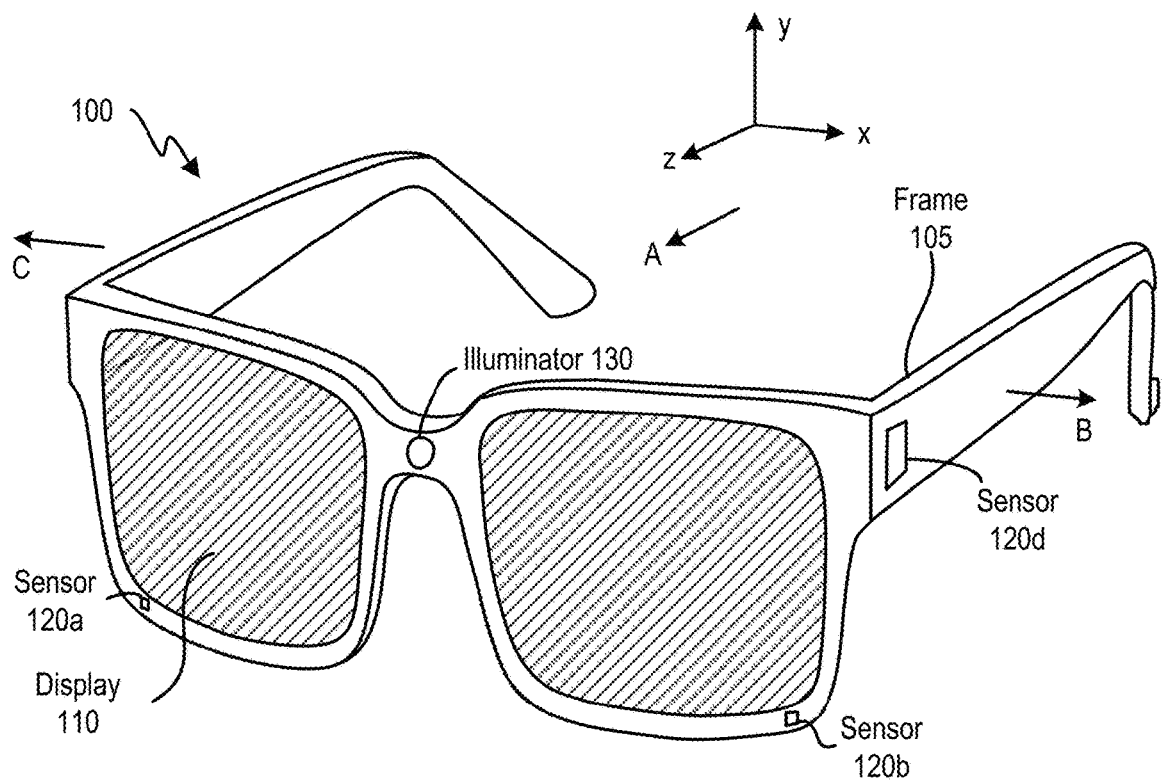
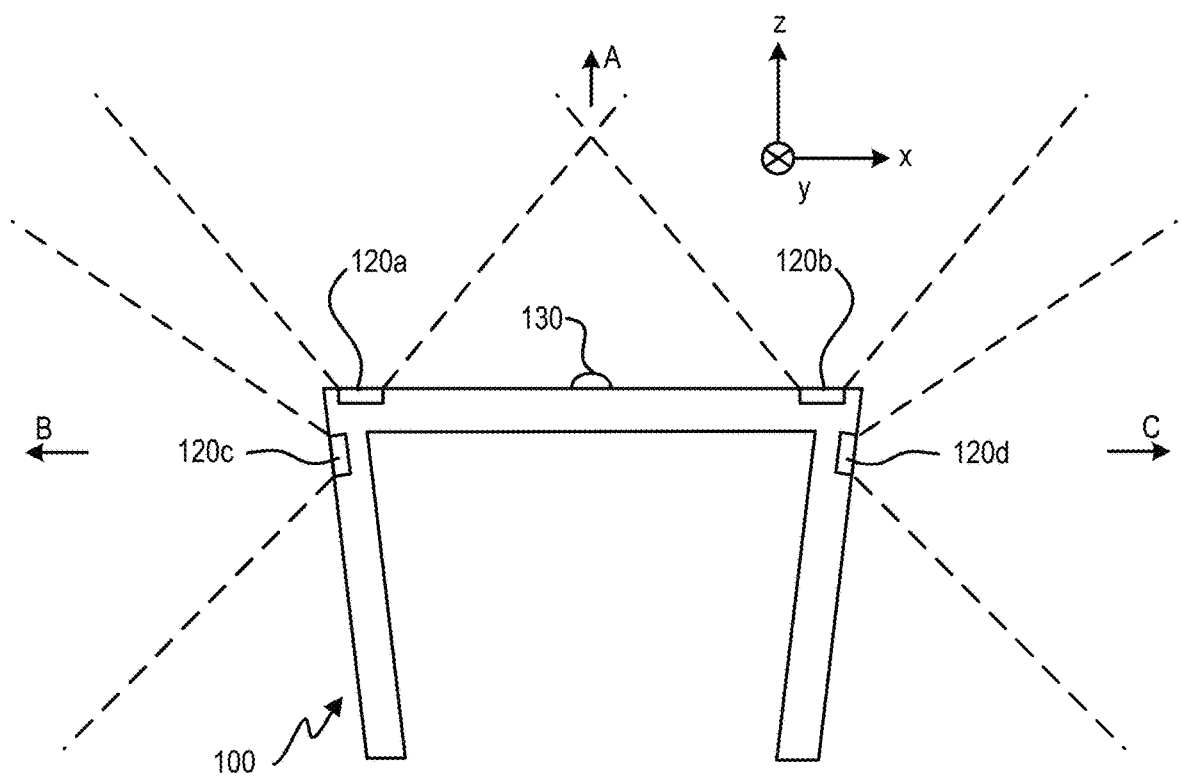
FIG. 1A

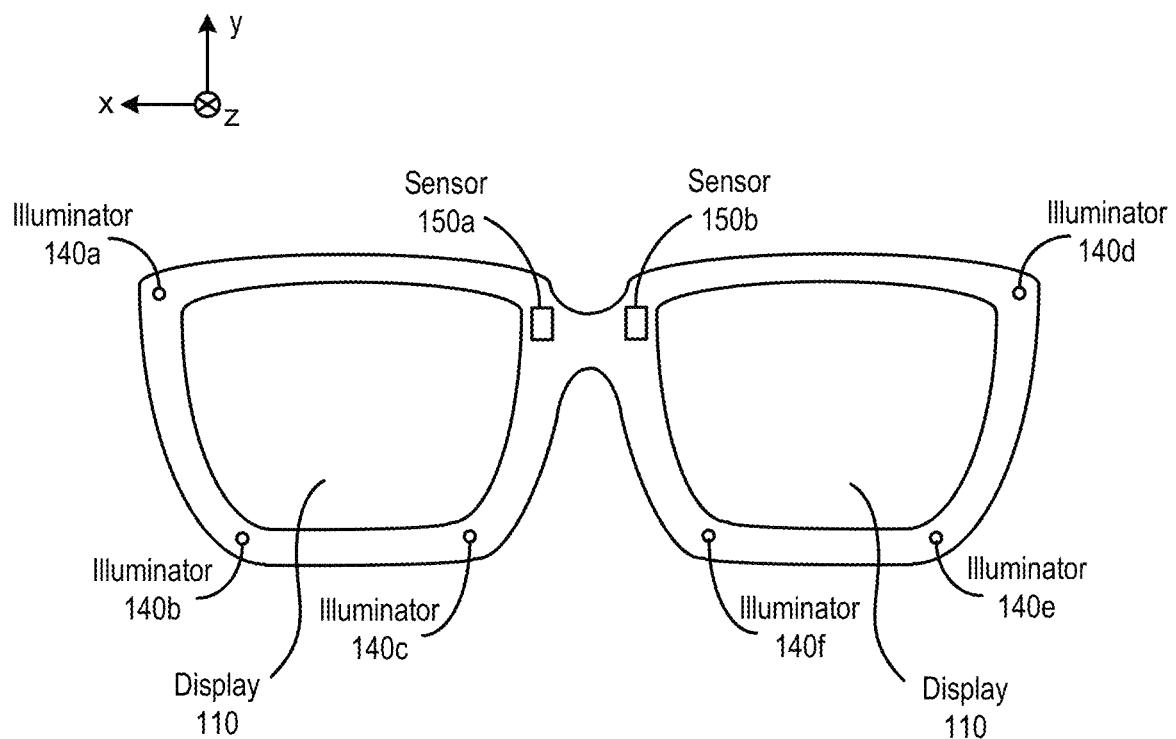
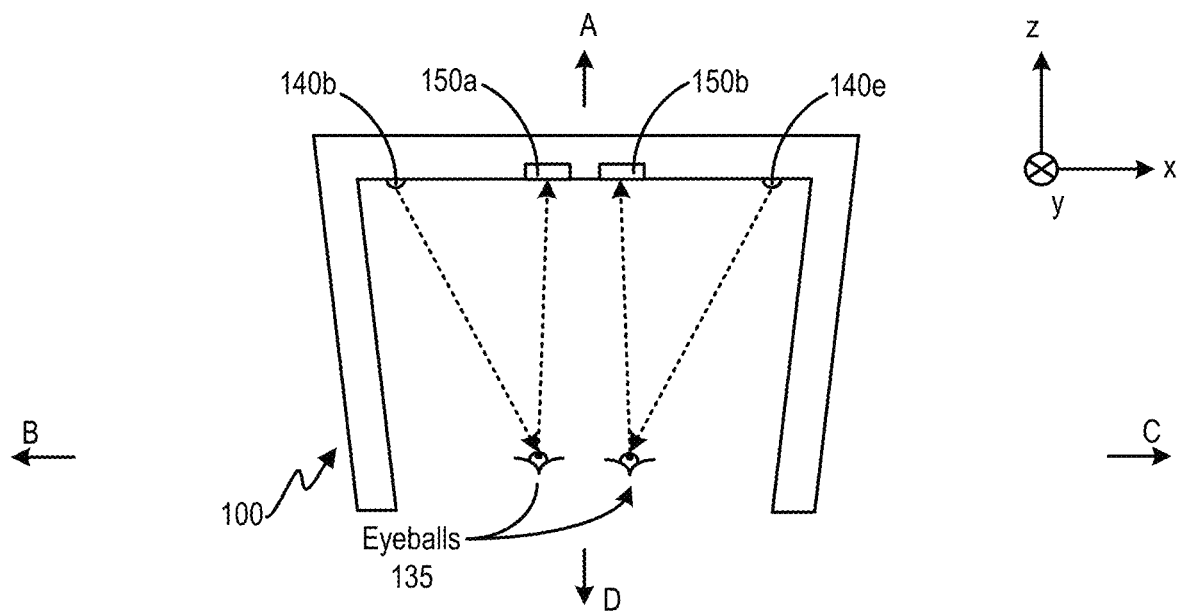
FIG. 1B

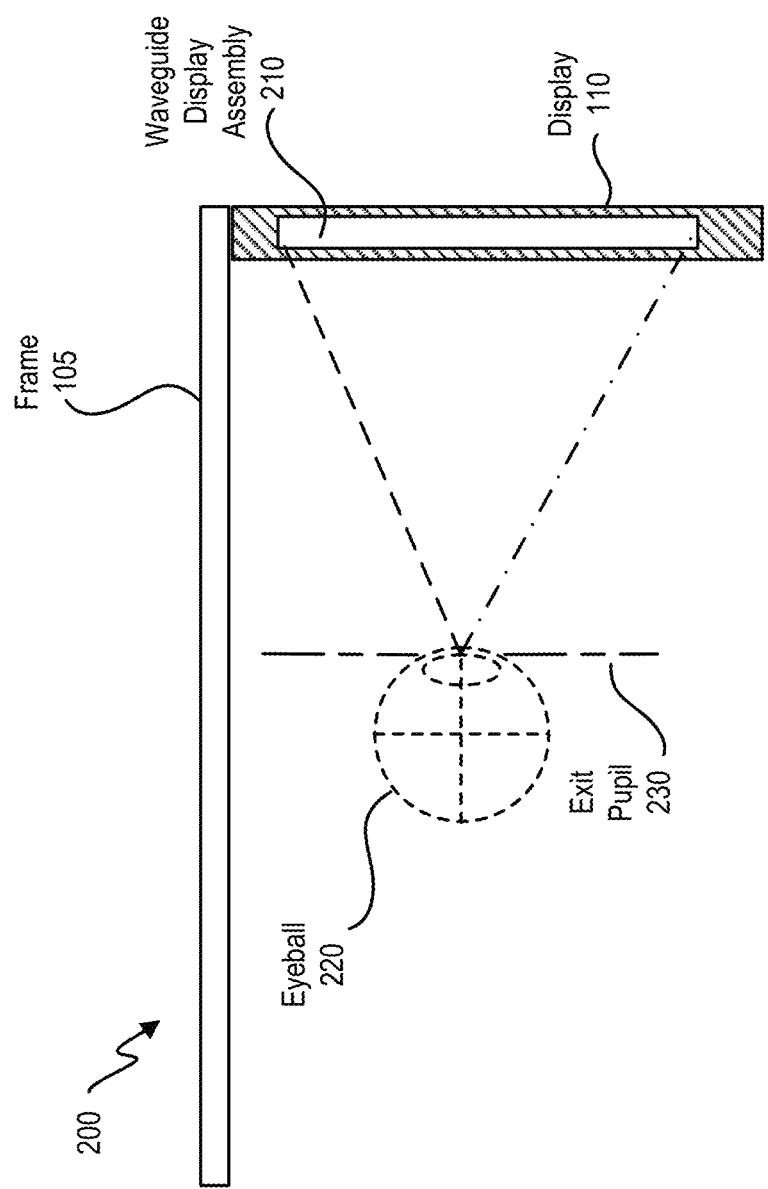

IMAGE RECONSTRUCTION FROM IMAGE SENSOR OUTPUT

RELATED APPLICATION

This patent application claims priority to U.S. Provisional Patent Application Ser. No. 62/659,081, filed Apr. 17, 2018, entitled "Image Reconstruction Algorithm for Image Sensor with Vertically-Stacked Pinned Photodiodes," which is assigned to the assignee hereof and is incorporated herein by reference in its entirety for all purposes.

BACKGROUND

The disclosure relates generally to image sensors, and more specifically to pixel cell structure including interfacing circuits to determine light intensity for image generation.

A typical image sensor includes an array of photodiodes to sense incident light by converting photons into charge (e.g., electrons or holes), which can be measured and quantized into an array of digital values. An image can be reconstructed based on the array of digital values. The array of photodiodes can be configured to sense incident light of pre-configured wavelength ranges (e.g., a wavelength range associated with visible light, a wavelength range associated with infrared light, etc.), and the array of digital values can be used to reconstruct 2D or 3D images based on the pre-configured wavelength ranges.

SUMMARY

The present disclosure relates to image sensors. More specifically, and without limitation, this disclosure relates to reconstruction of images based on image sensor outputs.

The present disclosure provides examples of an apparatus. The apparatus comprises a plurality of sensing units, each sensing unit comprising one or more photodiodes, each of the one or more photodiodes being associated with a channel having a target wavelength range for photon-to-charge conversion; and an image processor configured to: receive input data generated by the photodiodes of the plurality of sensing units responsive to incident light; obtain, for each channel, a plurality of channel coefficients, the plurality of channel coefficients being configured to, when combined with the input data to generate channel output data for the each channel, increase a main component of the channel output data contributed by a part of the incident light within the target wavelength range of the each channel with respect to a crosstalk component of the channel output data contributed by a part of the incident light out of the target wavelength range; and generate, for the each channel, the channel output data based on combining the input data with the plurality of channel coefficients to reconstruct an image for the each channel.

In some aspects, the apparatus further comprises a calibration module configured to: obtain data representing a raw spectral response curve of each photodiode of the photodiodes, the raw spectral response curve representing a spectral response of the each photodiode operating in the respective sensing unit to light of a wavelength range, the data representing the raw spectral response curves being combinable with the plurality of channel coefficients of the each channel to generate a target spectral response curve for the each channel; and determine, for the each channel, a plurality of channel separation coefficients that maximizes a first portion of the target spectral response curve within the target wavelength range of the each channel with respect to a second portion of the target spectral response curve out of the target wavelength range of the each channel. The plurality of channel separation coefficients for the each channel is part of the plurality of channel coefficients for the each channel.

In some aspects, the raw spectral response curve of each photodiode includes a first portion within the target wavelength of the channel associated with the each photodiode and a second portion out of the target wavelength out of the channel associated with the each photodiode. The calibration module is configured to, for the each channel: determine, for each raw spectral response of the raw spectral responses, a first portion that is within the target wavelength range of the each channel and a second portion that is outside the target wavelength range; determine an in-band matrix based on correlations among the first portions of the raw spectral responses; determine an out-of-band matrix based on correlations among the second portions of the raw spectral responses; and determine the plurality of channel separation coefficients that increases a first combination of the in-band matrix and the plurality of channel separation coefficients with respect to a second combination of the out-of-band matrix and the plurality of channel separation coefficients.

In some aspects, the first combination comprises a matrix multiplication of a transpose of a third matrix comprising the plurality of channel separation coefficients, the in-band matrix, and the third matrix. The second combination comprises a matrix multiplication of the transpose of the out-of-band matrix, the second matrix, and the third matrix.

In some aspects, the determination of the plurality of coefficients comprises solving a generalized-Eigenvalue problem of maximizing a ratio between the first combination and the second combination.

In some aspects, the calibration module is configured to: determine, for the each channel, the target spectral response curve based on combining the raw spectral response curves with the plurality of channel coefficients of the each channel; and determine, for the each channel, a plurality of channel crosstalk coefficients that indicate crosstalk components of the channel output data of the each channel contributed by the plurality of photodiodes. The plurality of channel crosstalk coefficients of the each channel is determined based on minimizing a difference between the spectral response curve of the each channel and a combination of the plurality of channel crosstalk coefficients of the each channel and the target spectral response curves. The plurality of channel separation coefficients for the each channel is part of the plurality of channel coefficients for the each channel.

In some aspects, the image processor is configured to: generate pre-processed input data for the each channel based on performing a demosaicing operation on the input data; and generate, for the each channel, the output data based on combining the pre-processed input data of the each channel with the plurality of channel separation coefficients of the each channel to reconstruct an image for the each channel.

In some aspects, the image processor is configured to: determine, based on the input data, a first image model associated with a visible light wavelength range and a second image model associated with an infrared light wavelength range; and generate the output data for the each channel based on minimizing, under a pre-determined constraint, a first difference between the first image model and a first combination of a first part of the output data associated with the visible light wavelength range and the plurality of channel crosstalk coefficients of the each channel and based on minimizing, under the pre-determined constraint, a second difference between the second image model and a second combination of a second part of the output data associated with the infrared light wavelength range and the plurality of channel crosstalk coefficients of the each channel.

In some aspects, the pre-determined constraint comprises a constraint on an image gradient.

In some aspects, the calibration module is configured to generate the channel crosstalk coefficients in Fourier domain. The image processor is configured to: generate the pre-processed input data in the Fourier domain; generate the image formation model in the Fourier domain; and generate the output data for the each channel based on minimizing a difference between the image formation model in the Fourier domain and a combination of the output data and the plurality of channel crosstalk coefficients of the each channel in the Fourier domain under the pre-determined constraint.

In some aspects, each sensing unit of the plurality of sensing units comprises a first photodiode and a second photodiode forming a stack along a direction perpendicular to a light receiving surface of the each sensing unit. In some aspects, each sensing unit of the plurality of sensing units comprises a single photodiode.

The present disclosure provides examples of a method. The method comprises: receiving input data generated by photodiodes of a plurality of sensing units responsive to incident light, wherein each sensing unit comprises one or more photodiodes, each of the one or more photodiodes being associated with a channel having a target wavelength range for photon-to-charge conversion; obtaining, for each channel, a plurality of channel coefficients, the plurality of channel coefficients being configured to, when combined with the input data to generate channel output data for the each channel, increase a main component of the channel output data contributed by a part of the incident light within the target wavelength range of the each channel with respect to a crosstalk component of the channel output data contributed by a part of the incident light out of the target wavelength range; and generating, for the each channel, the channel output data based on combining the input data with the plurality of channel coefficients to reconstruct an image for the each channel.

In some aspects, the method further comprises: obtaining data representing a raw spectral response curve of each photodiode of the photodiodes, the raw spectral response curve representing a spectral response of the each photodiode operating in the respective sensing unit to light of a wavelength range, the data representing the raw spectral response curves being combinable with the plurality of channel coefficients of the each channel to generate a target spectral response curve for the each channel; and determining, for the each channel, a plurality of channel separation coefficients that maximizes a first portion of the target spectral response curve within the target wavelength range of the each channel with respect to a second portion of the target spectral response curve out of the target wavelength range of the each channel. The plurality of channel separation coefficients for the each channel is part of the plurality of channel coefficients for the each channel.

In some aspects, the raw spectral response curve of each photodiode includes a first portion within the target wavelength of the channel associated with the each photodiode and a second portion out of the target wavelength out of the channel associated with the each photodiode. The method further comprises, for the each channel: determining, for each raw spectral response of the raw spectral responses, a first portion that is within the target wavelength range of the each channel and a second portion that is outside the target wavelength range; determining an in-band matrix based on correlations among the first portions of the raw spectral responses; determining an out-of-band matrix based on correlations among the second portions of the raw spectral responses; and determining the plurality of channel separation coefficients that increases a first combination of the in-band matrix and the plurality of channel separation coefficients with respect to a second combination of the out-of-band matrix and the plurality of channel separation coefficients.

In some aspects, the first combination comprises a matrix multiplication of a transpose of a third matrix comprising the plurality of channel separation coefficients, the in-band matrix, and the third matrix. The second combination comprises a matrix multiplication of the transpose of the out-of-band matrix, the second matrix, and the third matrix.

In some aspects, determining the plurality of coefficients comprises solving a generalized-Eigenvalue problem of maximizing a ratio between the first combination and the second combination.

In some aspects, the method further comprises: determining, for the each channel, the target spectral response curve based on combining the raw spectral response curves with the plurality of channel coefficients of the each channel; and determining, for the each channel, a plurality of channel crosstalk coefficients that indicate crosstalk components of the channel output data of the each channel contributed by the plurality of photodiodes. The plurality of channel crosstalk coefficients of the each channel is determined based on minimizing a difference between the spectral response curve of the each channel and a combination of the plurality of channel crosstalk coefficients of the each channel and the target spectral response curves. The plurality of channel separation coefficients for the each channel is part of the plurality of channel coefficients for the each channel.

In some aspects, the method further comprises: determining, based on the input data, a first image model associated with a visible light wavelength range and a second image model associated with an infrared light wavelength range; and generating the output data for the each channel based on minimizing, under a pre-determined constraint, a first difference between the first image model and a first combination of a first part of the output data associated with the visible light wavelength range and the plurality of channel crosstalk coefficients of the each channel and based on minimizing, under the pre-determined constraint, a second difference between the second image model and a second combination of a second part of the output data associated with the infrared light wavelength range and the plurality of channel crosstalk coefficients of the each channel.

The present disclosure further provides examples of a non-transitory computer readable medium storing instructions that, when executed by a hardware processor, causes the hardware processor to perform: receiving input data generated by photodiodes of a plurality of sensing units responsive to incident light, wherein each sensing unit comprises one or more photodiodes, each of the one or more photodiodes being associated with a channel having a target wavelength range for photon-to-charge conversion; obtaining, for each channel, a plurality of channel coefficients, the plurality of channel coefficients being configured to, when combined with the input data to generate channel output data for the each channel, increase a main component of the channel output data contributed by a part of the incident light within the target wavelength range of the each channel with respect to a crosstalk component of the channel output data contributed by a part of the incident light out of the target wavelength range; and generating, for the each channel, the channel output data based on combining the input data with the plurality of channel coefficients to reconstruct an image for the each channel.

BRIEF DESCRIPTION OF THE DRAWINGS

Illustrative embodiments are described with reference to the following figures.

FIG. 1A and FIG. 1B are diagrams of an embodiment of a near-eye display.

FIG. 2 is an embodiment of a cross section of the near-eye display.

Figure 3:
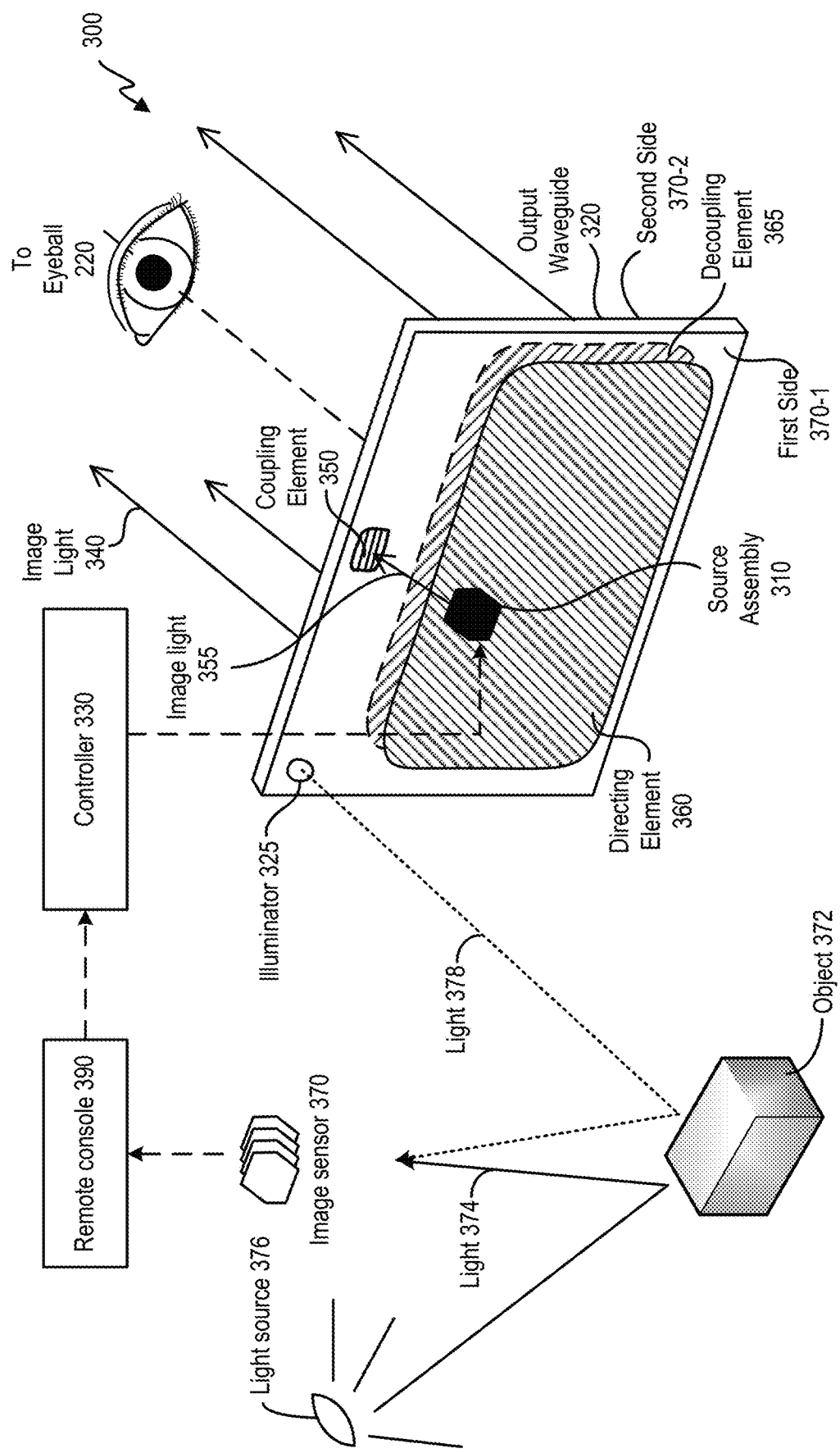
FIG. 3 illustrates an isometric view of an embodiment of a waveguide display with a single source assembly.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

A typical image sensor includes an array of sensing units. Each sensing unit can include a photodiode and a charge storage device (e.g., a capacitor). Each photodiode can sense incident light within an exposure period by converting photons into charge (e.g., electrons or holes), and the charge can be stored in the charge storage device. The charge stored in the charge storage device of each sensing unit can be quantized by an analog-to-digital converter (ADC) into a digital value, and an array of digital values can be generated. An image can be reconstructed based on the array of digital values. For example, each sensing unit can correspond to a pixel, or part of a pixel, and the digital values can represent pixel values. The pixel values can be further post-processed (e.g., interpolation, filtering, etc.) to assemble the image.

The array of sensing units can be associated with different sensing channels, each associated with a different wavelength range, to support different applications. For example, the array of sensing units may be configured to provide pixel data to reconstruct a 2D image for display. For such an application, the array of sensing units (and the photodiodes of the sensing units) can be configured to sense different wavelength sub-ranges within the wavelength range of visible light (e.g., 380 to 740 nanometers (nm)). Within the array, different sensing units can be associated with different channels, with each channel being associated with a wavelength range for a particular color, such as one of red (e.g., 635 to 700 nm), green (e.g., 520 to 560 nm), or blue (e.g., 450 to 490 nm) colors. A color filter array having a pre-configured pattern (e.g., a Bayer Pattern) can be overlaid on the array of sensing units, and each photodiode can be associated with a channel of a particular color of visible light based on the pre-configured pattern. A red image, a green image, and a blue image can be generated based on the digital values generated by the respective sensing units, and the images can be combined to generate a 2D image for display. As another example, the array of sensing units can be configured to sense infrared light (e.g., 700 nm to 1000 nm). A visible light blocking filter can be placed on the array of photodiodes to enable sensing of infrared light. An illuminator can project patterns of infrared light onto an object, and patterns of the reflected infrared light can be received by the array of photodiodes. Based on the reflected patterns and/or measuring a time-of-flight of the infrared light, a depth sensing operation can be performed to determine the distances between different points on the object and the image sensor, and a 3D image of the object can be generated. As yet another example, the array of sensing units can be configured to sense the entire wavelength range of the visible light to generate monochrome images. A monochrome filter can be provided to block out infrared light and allow only visible light (of all colors) onto the array of sensing units to support generation of 2D monochromic images, which can be used for feature extractions to support various positioning and mapping applications (e.g., a simultaneous localization and mapping (SLAM) operation).

In some examples, sensing units configured to provide 2D imaging (e.g., R/G/B imaging, monochrome imaging, etc.) and sensing units configured to provide 3D imaging (e.g., infrared light sensing) can be integrated together to form an array of sensing units, to facilitate fusion of 2D and 3D imaging data. The fusion of 2D and 3D imaging data can be useful for many applications that provide virtual-reality (VR), augmented-reality (AR) and/or mixed reality (MR) experiences. For example, a wearable VR/AR/MR system may perform scene reconstruction of an environment in which the user of the system is located. Based on the reconstructed scene, the VR/AR/MR can generate display effects to provide interactive experience. To reconstruct a scene, a first subset of the sensing units within the array can perform 3D sensing to, for example, identify a set of physical objects in the environment and determine the distances between the physical objects and the user. Another subset of the sensing units can perform 2D sensing to, for example, capture visual attributes including textures, colors, and reflectivity of these physical objects. The 2D and 3D image data of the scene can then be merged to create, for example, a 3D model of the scene including the visual attributes of the objects. As another example, a wearable VR/AR/MR system can also perform a head tracking operation based on a fusion of 2D and 3D image data. For example, based on the 2D image data, the VR/AR/AR system can extract certain image features to identify an object. Based on the 3D image data, the VR/AR/AR system can track a location of the identified object relative to the wearable device worn by the user. The VR/AR/AR system can track the head movement based on, for example, tracking the change in the location of the identified object relative to the wearable device as the user's head moves. In some examples, the photodiodes for 2D and 3D imaging can be collocated within the same pixel cells to provide direct correspondence between 2D and 3D pixels, which can simplify the fusion of the 2D and 3D imaging data.

The tight integration of 2D and 3D sensing units, which facilitating the fusion of the 2D and 3D imaging data, can introduce crosstalk between the 2D and 3D sensing photodiodes. Crosstalk occurs when a sensing photodiode receives and converts light that is out of a target wavelength of the sensing photodiode. For example, a 2D sensing photodiode may be configured to receive and convert light within a wavelength range of visible light, whereas a 3D sensing photodiode may be configured to receive and convert light within a wavelength range of infrared light. Due to crosstalk, the 2D sensing photodiode may also receive and convert infrared light, whereas the 3D sensing photodiode may also receive and convert visible light. As a result, the charge generated by each of 2D and 3D sensing photodiodes can include components from both visible light and infrared light. Moreover, among the 2D sensing photodiodes, crosstalk can also occur between different color channels, such that a photodiode configured to receive and convert visible light, a red component of visible light may also receive and convert other color components of visible light (e.g., blue, green, etc.). As a result, the charge generated by the red sensing photodiode may include not only the red component but also the blue and/or green components.

Crosstalk can degrade the sensitivity of the photodiodes and introduce errors to the 2D and 3D imaging data, since an image generated from 2D or 3D sensing photodiodes can include components that are not in a target wavelength range. When such an image is provided to an application that operates based on sensing of light of the target wavelength range, errors can be introduced to the operation of the application. As an illustrative example, a 2D monochrome image generated based on the outputs of 2D sensing photodiodes can include image features of objects in a physical environment, and the image features can be extracted by an image processor and can be tracked (e.g., by a SLAM algorithm) to determine a location of the apparatus within the physical environment. But if the outputs of 2D sensing photodiodes also include infrared components which are not features of the objects, and those components are incorrectly extracted as features of the object and input to the SLAM algorithm, errors can be introduced to the location determination of the apparatus.

This disclosure relates to an image sensor that can address at least some of the issues described above. The image sensor may include a plurality of sensing units and an image processor. Each sensing unit includes one or more photodiodes and is associated with a channel having a target wavelength range for photon-to-charge conversion by the one or more photodiodes. The image processor can receive input data generated by the plurality of sensing units responsive to incident light. The image processor can also obtain, for each channel of the plurality of channels, a plurality of channel coefficients. The plurality of channel coefficients of each channel is configured to, when combined with the input data to generate output data for the each channel, maximize a main component of the output data contributed by a part of the incident light within the target wavelength range of the each channel with respect to a crosstalk component of the output data contributed by a part of the incident light out of the target wavelength range. The image sensor can then generate, for the each channel, the output data based on combining the input data with the plurality of channel coefficients to reconstruct an image for the each channel.

Specifically, the image sensor may include a color filter over a first sensing unit including a first photodiode and a second photodiode forming a stack within a semiconductor substrate. The target wavelength range for each of the first photodiode and the second photodiode can be set based on optical filtering (e.g., by the color filter) as well as semiconductor filtering. Specifically, the color filter can allow a color component of visible light (e.g., a red component within a wavelength range of 635 to 700 nm) as well as infrared light (700 nm to 1000 nm) to pass through. The first photodiode can be closer to the light receiving surface of the first sensing unit and is configured to primarily convert the blue component of light to charge, whereas the second photodiode can be further away from the light receiving surface and is configured to primarily convert the infrared component of light to charge, as much of the visible light component will be absorbed by the first photodiode and the semiconductor substrate before reaching the second diode. But due to imperfect separation/insulation between the photodiodes and between neighboring sensing units, as well as imperfect absorption of light by the photodiodes and by the semiconductor substrate, crosstalk between the different bands of wavelengths may occur. The first photodiode may convert photons of some of the infrared component of the incident light to charge, and the second photodiode may also convert photons of some of the red component of the incident light to charge. As a result, the charge generated by the first photodiode may include a main component contributed by the red visible light as well as a crosstalk component contributed by the infrared light. The charge generated by the second photodiode may include a main component contributed by the infrared light as well as a crosstalk component contributed by the red visible light.

According to the disclosed embodiments, the image processor can obtain a plurality of channel coefficients for each channel, and combine input data from the plurality of sensing units with the plurality of channel coefficients to generate output data for the each channel. The channel coefficients can be generated by a calibration module that is part of the image sensor, or can be provided by an external source. The channel coefficients of each channel can be configured to maximize a main component of the output data contributed by incident light within the target wavelength range of the each channel with respect to a crosstalk component of the output data contributed by incident light outside the target wavelength. Referring back to the example above, with the disclosed embodiments, the image processor can combine the input data from the first sensing unit with a plurality of channel coefficients associated with a red channel to generate the output data for the red channel, and the plurality of channel coefficients can maximize the main component of the output data contributed by red visible light with respect to the crosstalk component of the output data contributed by light of other wavelength ranges, including infrared light. The image processor can also use the disclosed techniques to reduce crosstalk in other sensor architectures and not just for sensing units having stacked photodiodes.

Different techniques of generating the plurality of channel coefficients are proposed. In one example, the plurality of channel coefficients may include a plurality of channel separation coefficients determined based on the raw spectral response curves of each sensing unit. A raw spectral response curve can represent the response of a photodiode (e.g., based on rate of charge generation responsive to incident light) operating within a sensing unit as a function of the wavelength of incident light. The raw response curves reflect the optical filtering and the semiconductor filtering of the sensing unit, as well as the effect of crosstalk. The plurality of channel separation coefficients of the each channel can be combined with the raw spectral responses to determine a target spectral response for the each channel, and the plurality of channel separation coefficients can be determined based on maximizing a target spectral component of the target spectral response within the target wavelength range of the each channel with respect to a crosstalk spectral component of the target spectral response outside the target wavelength range. Referring to the example above, the raw spectral response curves of the first photodiode and the second photodiode within the first sensing unit under the effect of the optical filtering (by the blue color filter) and semiconductor filtering (based on the stack structure) can be obtained. Based on the raw spectral response curves, a plurality of channel separation coefficients that, when combined with the raw spectral response curves to generate a target spectral response of the first sensing unit for a red channel, maximizes the target spectral component of the target spectral response within the red visible light wavelength range (635-700 nm) with respect to the crosstalk spectral component of the target spectral response outside the red visible light wavelength range.

In some examples, a first matrix can be determined based on target spectral components of each of the raw spectral responses within a target wavelength range of the each channel. A second matrix can also be determined based on crosstalk spectral components of each of the raw spectral responses outside the target wavelength range of the each channel. A first function based on a first multiplication involving the plurality of channel separation coefficients and the first matrix, and a second function based on a second multiplication involving the plurality of channel separation coefficients and the second matrix, can be determined for each channel. The plurality of channel separation coefficients for each channel can be determined based on solving a generalized-Eigen value problem of maximizing a ratio between the first function and the second function.

In some examples, the plurality of channel coefficients may include a plurality of channel crosstalk coefficients. The channel crosstalk coefficients can indicate a contribution of the crosstalk spectral components to the raw spectral response of a particular photodiode by each of the crosstalk sources (e.g., other photodiodes within the same sensing units, and other sensing units). The channel crosstalk coefficients can be combined with the target spectral responses (which can be determined based on combining the raw spectral responses and the channel separation coefficients) to obtain the raw spectral responses. A function based on a difference between a raw spectral response of a photodiode and a combination of the target spectral responses and the channel crosstalk coefficients can be obtained, and the channel crosstalk coefficients can be determined based on minimizing the function.

The image processor can combine input data from the plurality of sensing units with the plurality of channel coefficients to generate the output data for the each channel. In some examples, the image processor can generate pre-processed input data for the each channel based on performing a demosaicing operation on the input data, and combine the pre-processed input data with the channel separation coefficients to generate the output data for the each channel. In some examples, the image processor can determine an image formation model of the channels based on the pre-processed input data, and generate the output data for the each channel based on minimizing a difference between the image formation model and a combination of the output data and the plurality of channel crosstalk coefficients of the each channel under a pre-determined constraint, such as a constraint on image gradient. In some examples, the image processor can perform the processing of the input data based on the image formation model and the channel crosstalk coefficients in the Fourier domain, which can speed up the processing.

With the disclosed techniques, the crosstalk components in the outputs of the photodiodes can be reduced, which can improve the sensitivity of the photodiodes and reduce errors to the 2D and 3D imaging data. The disclosed techniques are also generic and independent from the sensor architecture, and can be used to reduce crosstalk components in the photodiode outputs across different sensor architectures. With reduced crosstalk, tight integration of sensors for different sensing channels can be achieved, which can facilitate the applications that rely on fusion of image data of different sensing channels.

The disclosed techniques may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an embodiment of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some embodiments, near-eye display 100 may further include one or more active illuminators 130 to project light into the physical environment. The light projected can be associated with different frequency spectrums (e.g., visible light, infrared light, ultraviolet light, etc.), and can serve various purposes. For example, illuminator 130 may project light in a dark environment (or in an environment with low intensity of infrared light, ultraviolet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120a or 120b can include both a first pixel array for visible light sensing and a second pixel array for infrared (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

FIG. 2 is an embodiment of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
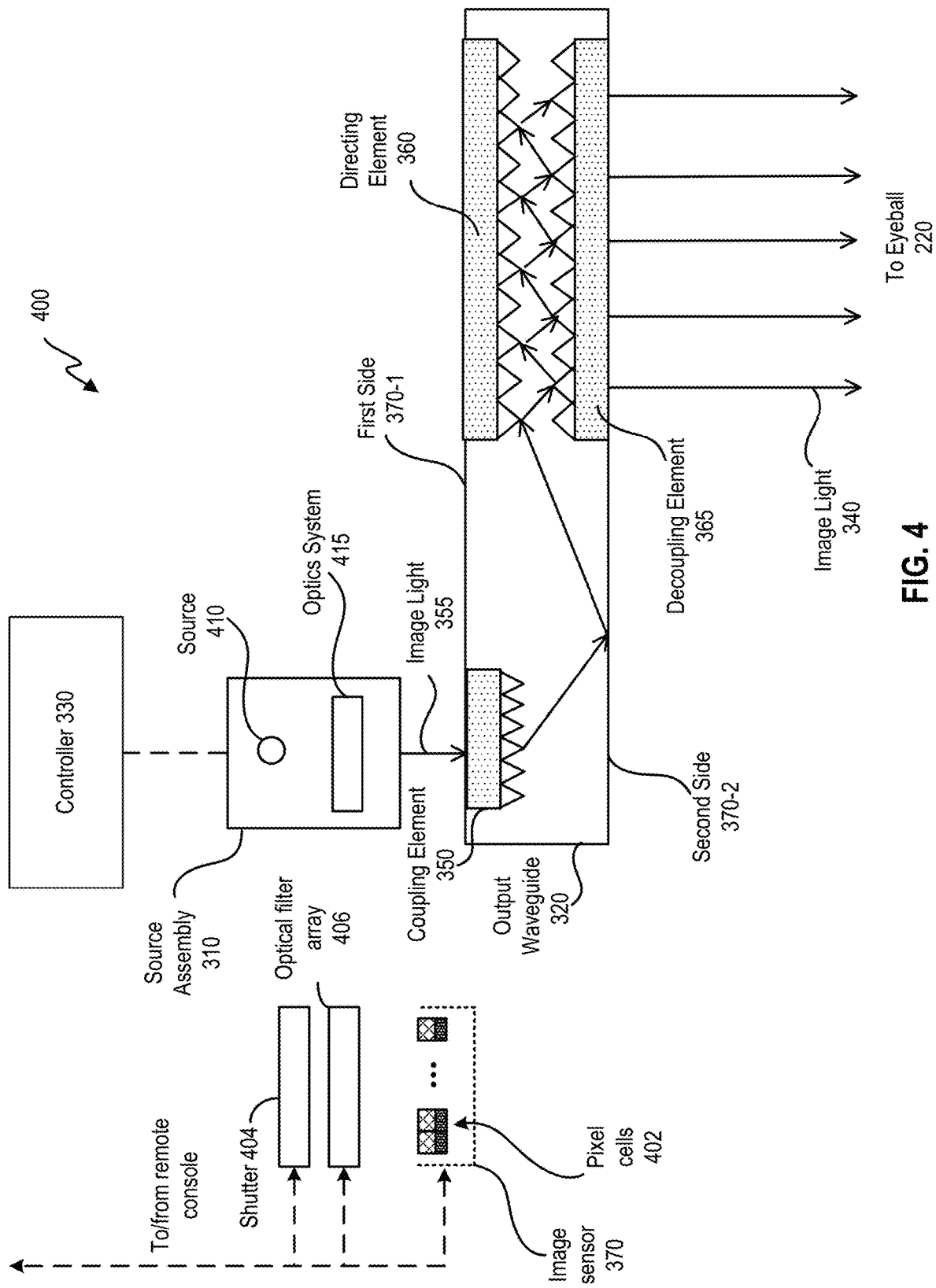
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 interposed between the set of pixel cells 402 and the physical environment to control the exposure of the set of pixel cells 402. In some embodiments, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
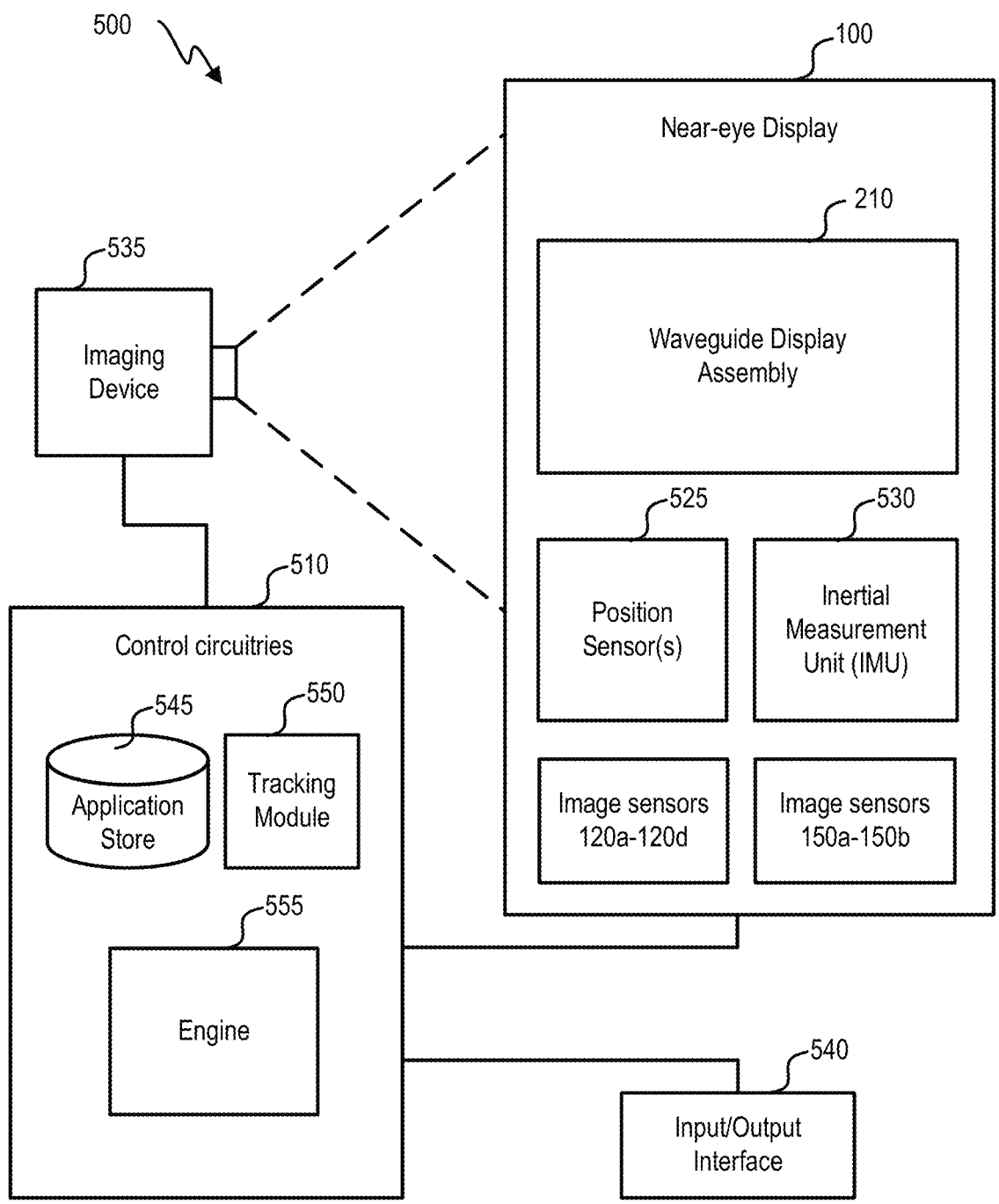
FIG. 5 is a block diagram of an embodiment of a system including the near-eye display.

FIG. 5 is a block diagram of an embodiment of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6A:
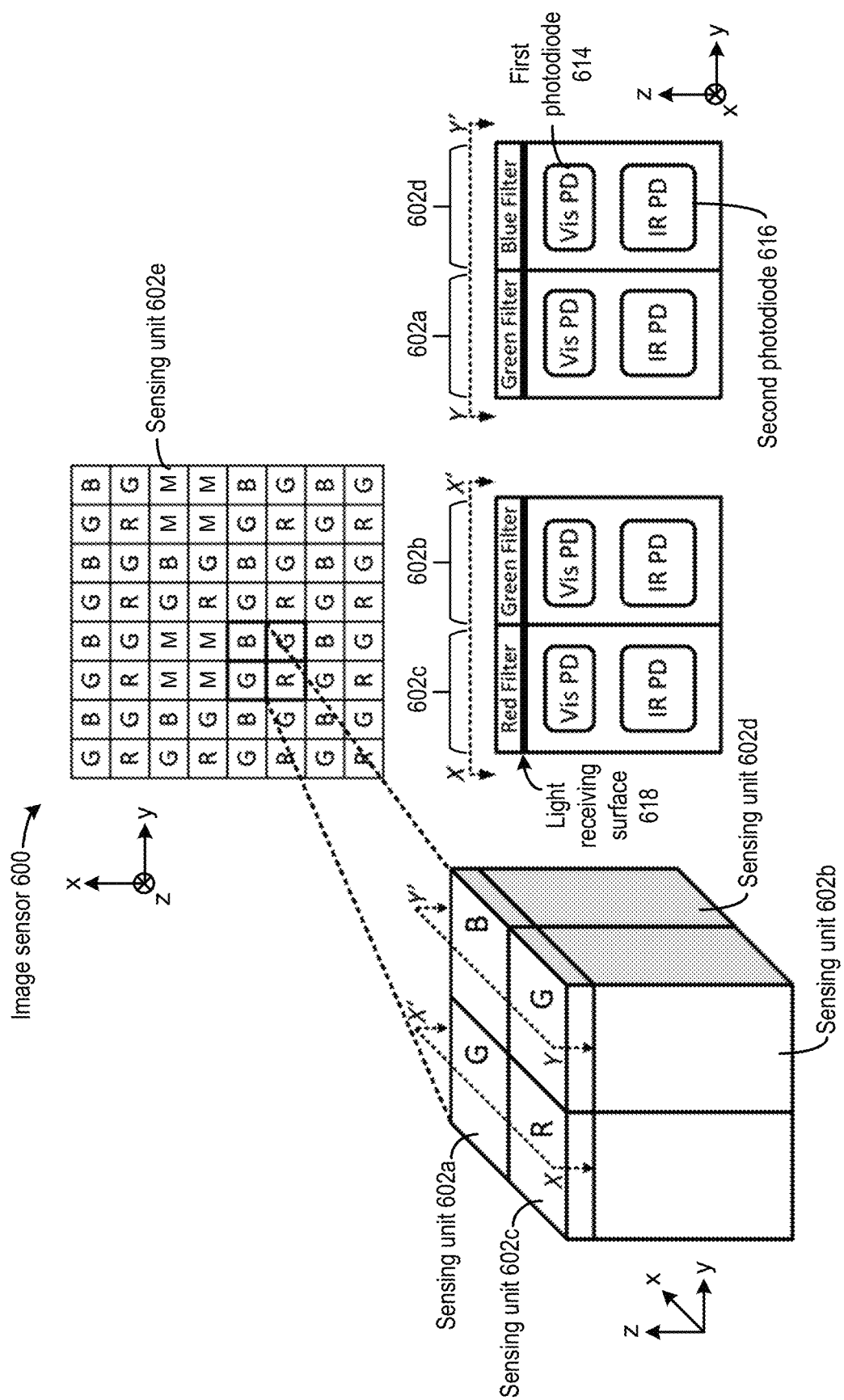
FIG. 6A and FIG. 6B illustrate examples of an image sensor.
Figure 6B:
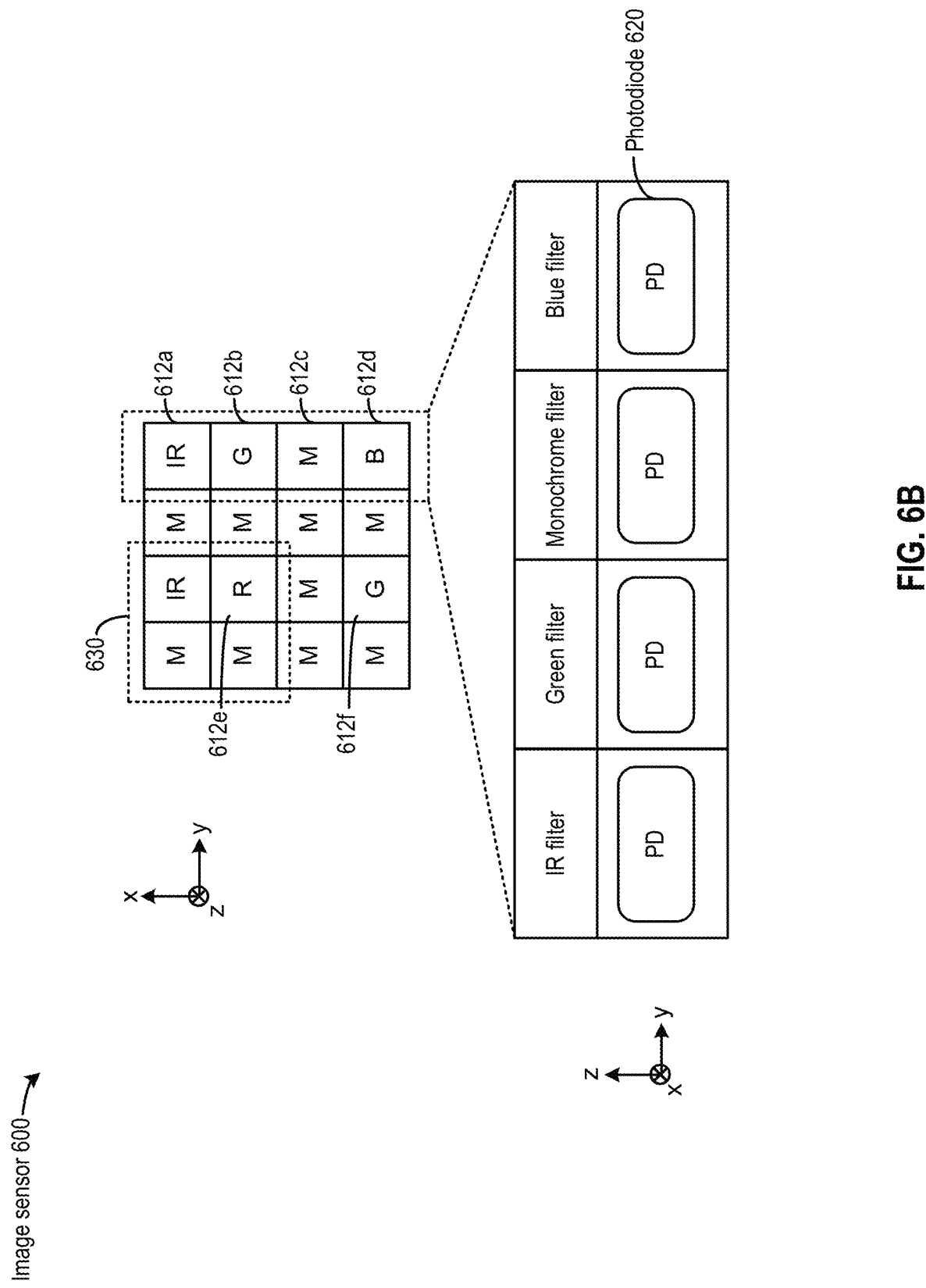

FIG. 6A and FIG. 6B illustrates examples of an image sensor 600 that can provide data to control circuitries 510 to determine the content presented to the user. As shown in FIG. 6A, image sensor 600 includes an array of sensing units 602 including, for example, sensing units 602a, 602b, 602c, 602d, 602e, etc. Moreover, in FIG. 6B, image sensor 600 includes an array of sensing units 612 including, for example, sensing units 612a, 612b, 612c, 612d, 612e, etc. Each sensing unit may be formed in a semiconductor substrate and may include one or more photodiodes configured to perform photo-to-charge conversion, and one or more charge storage devices (not shown in FIG. 6A and FIG. 6B) to store the charge generated by the one or more photodiodes. In FIG. 6A, each sensing unit 602 of image sensor 600 may include a first photodiode 614 and 616 and a second photodiode forming a stack perpendicular to light receiving surface 618 (e.g., along the z-axis), whereas in FIG. 6B, each sensing unit 612 of image sensor 600 may include one photodiode 620.

The array of sensing units of image sensor 600 can be associated with different sensing channels, each associated with a different wavelength range, to support fusion of 2D and 3D sensing. The sensing channels can be configured based on optical filtering and/or semiconductor filtering by the semiconductor substrate. For example, in FIG. 6A, sensing units 602a and 602b may include a green color optical filter, which allows first photodiode 614 of sensing units 602a and 602b to receive and convert a green visible color component (e.g., with a wavelength range of 520 to 560 nm) to charge. Moreover, sensing unit 602c may include a red color optical filter, which allows first photodiode 614 of sensing unit 602c to receive and convert a red visible color component (e.g., with a wavelength range of 635 to 700 nm) to charge. Moreover, sensing unit 602d may include a blue color optical filter, which allows first photodiode 614 of sensing unit 602d to receive and convert a blue visible color component (e.g., with a wavelength range of 450 to 490 nm) to charge. Sensing units 602a-602d can correspond to a basic unit of Bayer filter pattern, and their outputs can be combined to generate the color and intensity information of a pixel. Further, sensing unit 602e does not include an optical filter, and first photodiode 614 of sensing unit 602e can convert photons of the entire visible light wavelength to charge. In addition, the semiconductor substrate and first photodiode 614 of each of sensing units 602 can provide semiconductor filtering to remove the visible light component, such that the second photodiode 616 of each of sensing units 602 primarily detect and convert infrared light (e.g., with a wavelength range of 700 to 1000 nm) to charge.

Moreover, in FIG. 6B, each of sensing units 612a, 612b, 612c, 612d, 612e includes an optical filter to control the wavelength range of light received by the photodiode 620 in the each sensing unit. For example, sensing unit 612a includes an infrared (IR) filter that passes infra-light, sensing units 612b and 612f include a green color filter that passes the visible green color component, sensing unit 612c includes a monochrome filter that passes visible light, sensing unit 612d includes a blue color filter that passes the visible blue color component, whereas sensing unit 612e includes a red color filter that passes the visible red color component. A group of sensing units 612 can also form a super pixel 630, which can include multiple channels of data (e.g., monochrome, IR, one of red/blue/green color) for a pixel.

Figure 7A:
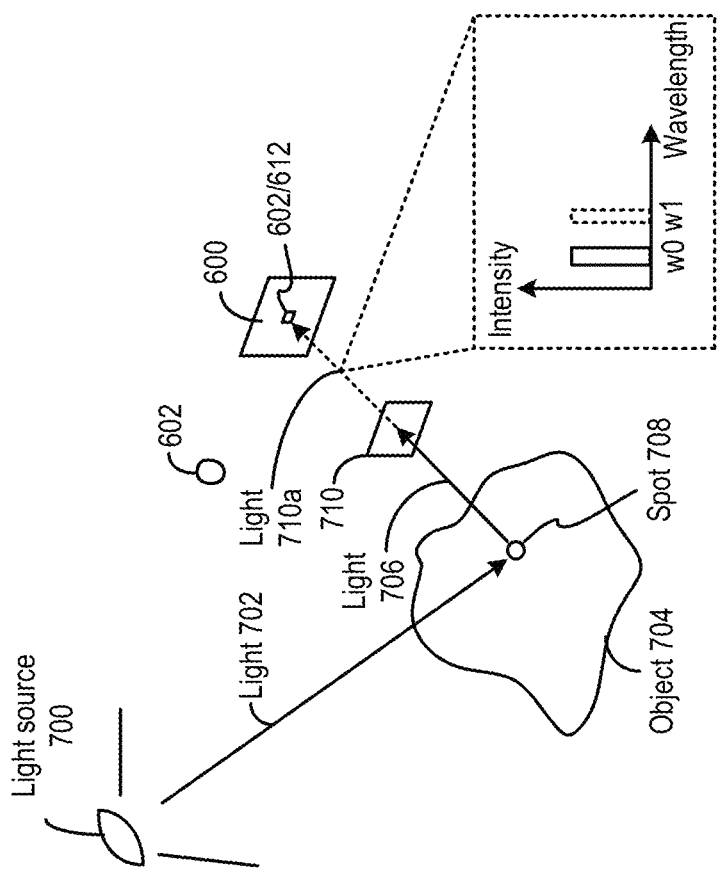
FIG. 7A and FIG. 7B illustrate examples of operations of the image sensor of FIG. 6A and FIG. 6B for 2D and 3D imaging.
Figure 7B:
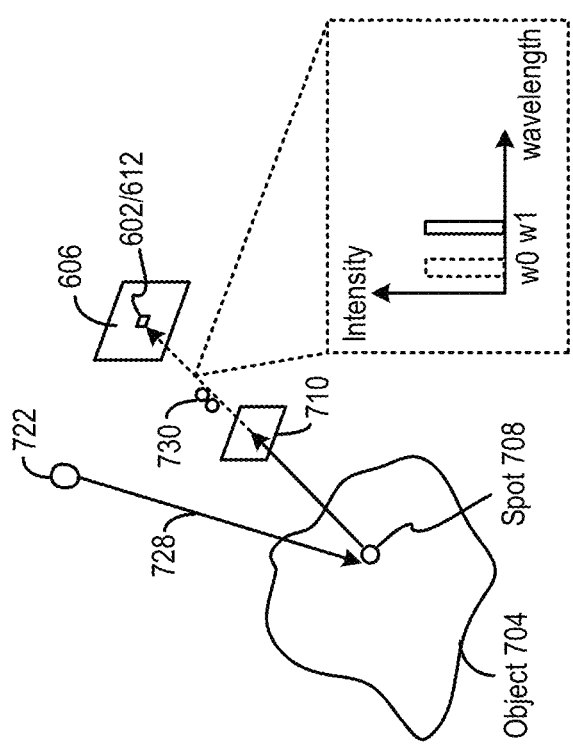

Reference is now made to FIGS. 7A and 7B, which illustrate examples of operations of image sensor 600 for 2D and 3D imaging. FIG. 7A illustrates an example of operations for 2D imaging. For 2D imaging, image sensor 600 can detect visible light in the environment including visible light reflected off an object. For example, referring to FIG. 7A, visible light source 700 (e.g., a light bulb, the sun, or other sources of ambient visible light) can project visible light 702 onto an object 704. Visible light 706 can be reflected off a spot 708 of object 704. Visible light 706 can be filtered by optical filter array 710 (e.g., one of red, green, blue, or monochrome filters) to pass a pre-determined wavelength range w0 of the reflected visible light 706, to produce filtered light 710a. Wavelength range w0 may correspond to a first color component of visible light 706 (e.g., a red color component having a wavelength range of 620-750 nanometers (nm)) reflected off spot 708. Filtered light 710a can be captured by first photodiode 614 of sensing unit 602c of FIG. 6A or by photodiode 620 of sensing unit 612e of FIG. 6B to generate and accumulate charge within an exposure period. At the end of the exposure period, the accumulated charge can be transferred to a charge storage device to develop a voltage. The voltage can be sampled and quantized by an analog-to-digital converter (ADC) to generate a digital value. An array of digital values can be generated based on the outputs of array of sensing units of image sensor 600, which can be used to construct, for example, 2D images of object 704 in different channels (e.g., red, green, blue, monochrome, etc.).

Furthermore, image sensor 600 can also perform 3D imaging of object 704. Referring to FIG. 7B, an illuminator 722 can be controlled to project infrared light 728, which can include a light pulse, structured light, etc., onto object 704. Infrared light 728 can have a wavelength range of 700 nanometers (nm) to 1 millimeter (mm). Infrared photons 730 can reflect off of object 704 and propagate towards image sensor 600 and pass through optical filter 710, and the photodiodes of sensing units 602/612 can convert infra-red photons 730 to charge. The detection and conversion of infrared photons 730 can occur within the same exposure period as the detection and conversion of visible light 706. Such arrangements allow each pixel cell to perform 2D and 3D imaging of the same spot of an object, which can improve the correspondence between the 2D and 3D images.

Figure 8A:
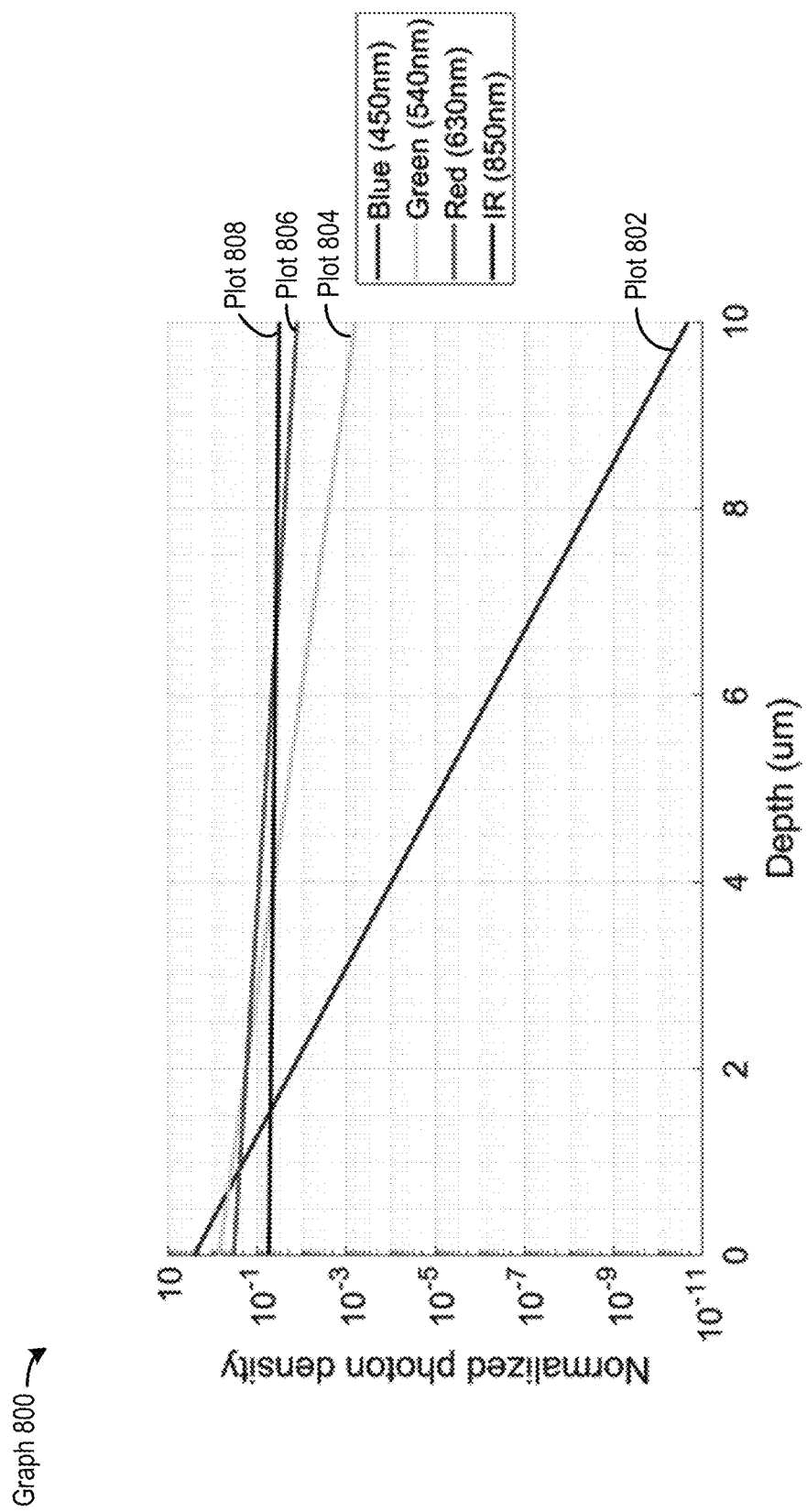
FIG. 8A, FIG. 8B, and FIG. 8C illustrate example characteristics of sensing units of the image sensor of FIG. 6A and FIG. 6B.
Figure 8B:
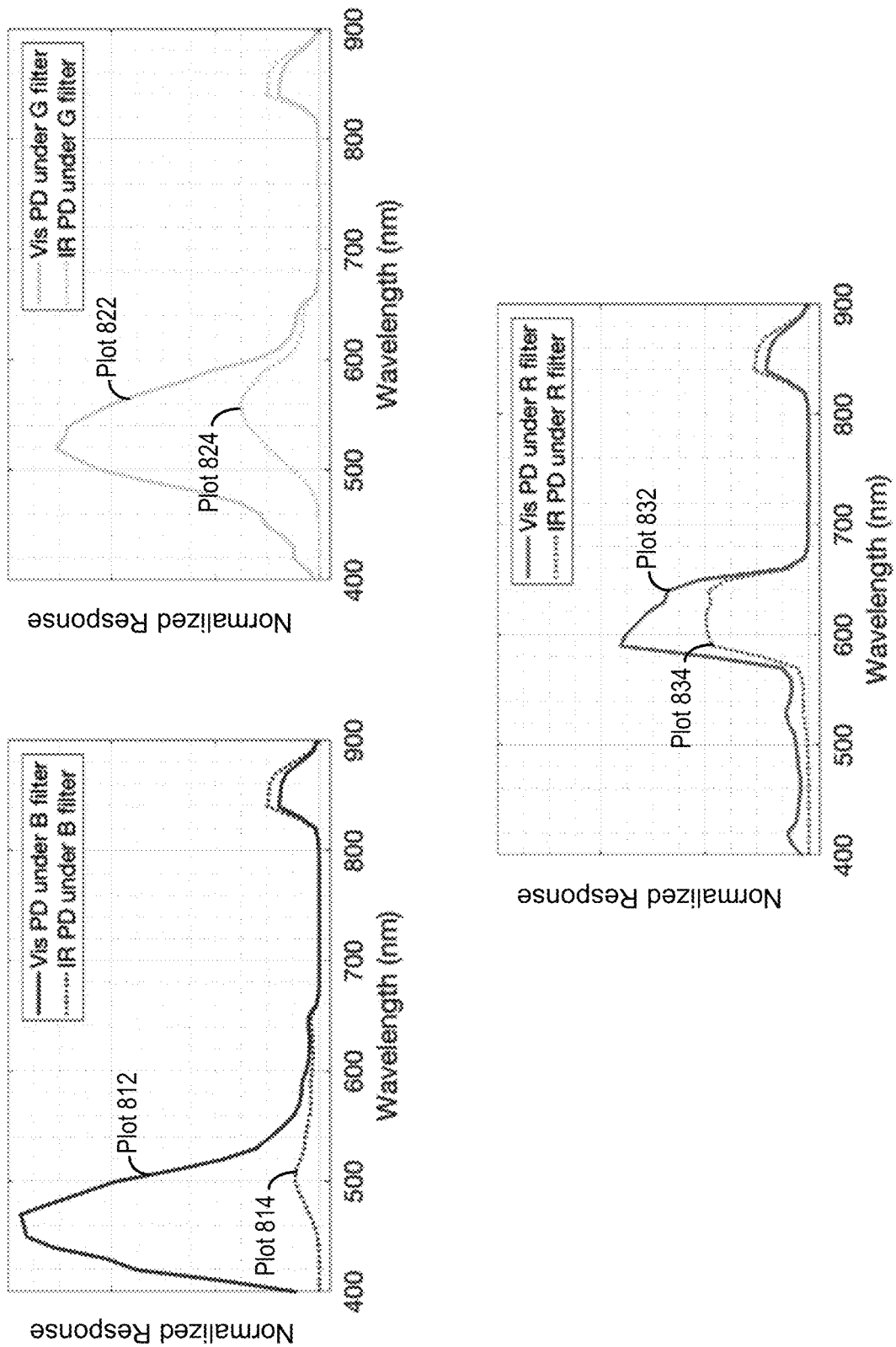
Figure 8C:
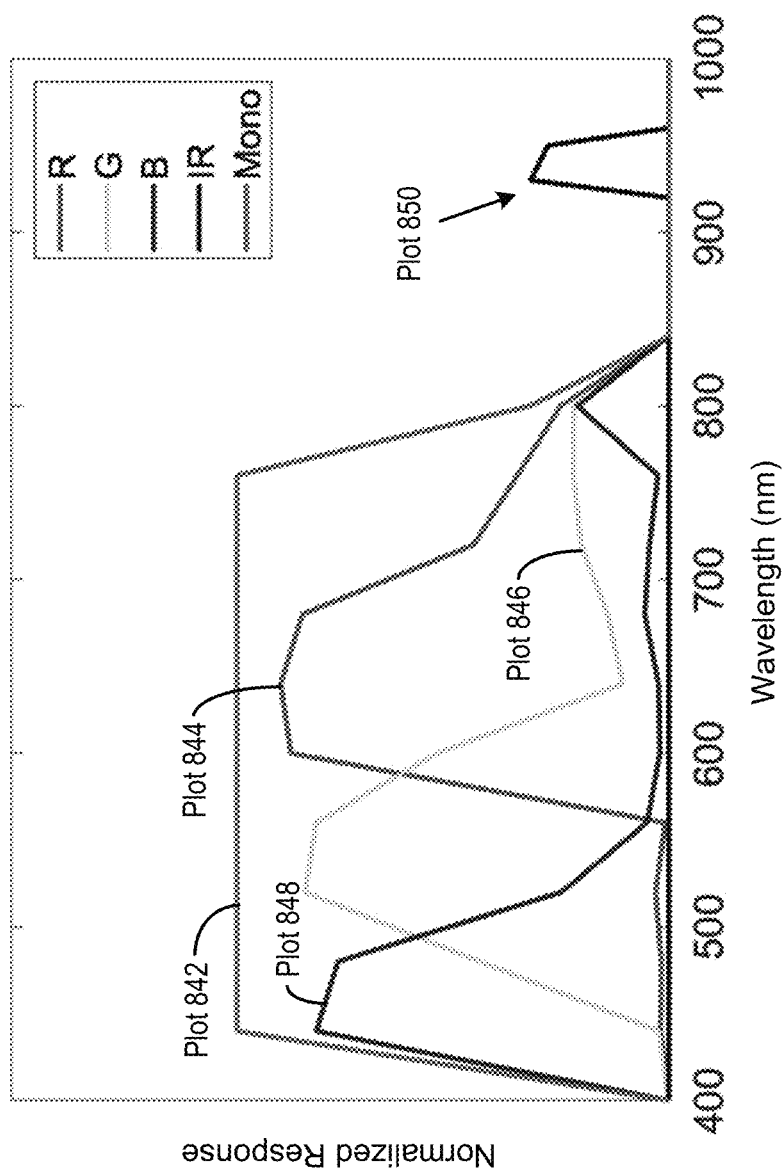

FIG. 8A, FIG. 8B, and FIG. 8C illustrate example characteristics of sensing units 602 of FIG. 6A and sensing units 612 of FIG. 6B. FIG. 8A illustrates a graph 800 of distribution of photon density in the semiconductor substrate of sensing units 602 along the z-axis. In FIG. 8A, the vertical axis of graph 800 represents the normalized photon density, whereas the horizontal axis represents depth (along the z-axis) measured from light receiving surface 618. The normalized photon intensity (hereinafter, "photon intensity") can be determined based on a ratio between a quantity of photon generated at a particular wavelength and the total quantity of photon generated across the entire wavelength range (e.g., 400 nm-900 nm). Plot 802 represents the distribution of photon density for blue light, plot 804 represents the distribution of photon density for green light, plot 806 represents the distribution of photon density for red light, whereas plot 808 represents the distribution of photon density for infra-red (IR) light. As shown in FIG. 8A, photons of different wavelengths can experience different attenuations as the photons propagate across sensing units 602 from light receiving surface 618. The attenuations can be due to, for example, absorption of the photons by the semiconductor substrate. The different attenuations allow the semiconductor substrate to act as a semiconductor filter to separate out photons of different wavelengths. For example, IR photons experience a smaller degree of attenuation than blue, red, and green photons as the photons propagate away from light receiving surface 618. As a result, second photodiode 616, which is positioned further away from light receiving surface 618 than first photodiode 614, can primarily detect and convert IR photons to charge, as much of the visible light photons have been absorbed by the semiconductor substrate and first photodiode 614 when they reach second photodiode 616. First photodiode 614 can primarily detect and convert visible light photons to charge.

Although the semiconductor substrate of sensing units 602 can provide a semiconductor filtering function, the filtering is not perfect. The degree of attenuations also vary among the different visible light components, with blue light photons experiencing much larger attenuation than red and green light photons. In addition, the optical filter may provide imperfect attenuation/rejection of out-of-band light components. Photons may also leak from neighboring sensing units. All these can cause crosstalk, in which each of first photodiode 614 and second photodiode 616 can receive photons outside the target wavelength range. For example, second photodiode 616 may receive a considerable quantity of red and green light photons, whereas first photodiode 616 may also receive and absorb a certain quantity of IR photons.

FIG. 8B illustrates raw spectral response curves of the photodiodes of sensing units 602 of FIG. 6A. The raw spectral response curves can represent the responses of a photodiode (e.g., based on a rate of photon generation) operating within a sensing unit (e.g., one of sensing units 602a, 602b, 602c, 602d, or 602e) as a function of the wavelength of incident light. The raw spectral response curves can reflect the optical filtering and the semiconductor filtering of the each sensing unit, as well as the effect of crosstalk. The raw spectral response curves can be simulated data. In FIG. 6A, plots 812 and 814 can represent the raw spectral responses of, respectively, first photodiode 614 and second photodiode 616 of sensing unit 602d having a blue color filter. Moreover, plots 822 and 824 can represent the raw spectral responses of, respectively, first photodiode 614 and second photodiode 616 of sensing unit 602b having a green color filter. Further, plots 832 and 834 can represent the raw spectral responses of, respectively, first photodiode 614 and second photodiode 616 of sensing unit 602c having a red color filter.

Each raw spectral response in FIG. 8B exhibits certain degrees of crosstalk. For example, plot 812 can represent the raw spectral response of first photodiode 614 of sensing unit 602d which primarily senses blue light within the wavelength range 450 to 490 nm. Plot 812 include a target spectral component within the wavelength range 450 to 490 nm. However, plot 812 also includes crosstalk components outside the wavelength range 450 to 490 nm, such as a crosstalk component within the IR wavelength range 800 to 900 nm due to absorption of IR light by first photodiode 614 (or imperfect IR light attenuation in the case of FIG. 6B). Moreover, plot 814 is the raw spectral response of second photodiode 616 of sensing unit 602d which primarily senses IR light. Plot 814 includes a target spectral component within the IR wavelength range 800 to 900 nm. However, due to imperfect attenuation of blue light, second photodiode 616 may convert a certain quantity of photons of blue light to light, as indicated by the crosstalk component within the wavelength range 450 to 490 nm of plot 814. As shown in plots 824 and 834, the crosstalk components of the raw spectral responses of second photodiodes 616 of sensing units 602b (having a green filter) and 602c (having a red filter) are larger than in sensing unit 602d. This can be because, as shown in FIG. 8A, both green light and red light experience much less attenuation in the semiconductor substrate than blue light. As a result, second photodiodes 616 of both sensing units 602b and 602c can receive and convert a large quantity of out-of-band photons, resulting in larger crosstalk components.

FIG. 8C illustrates raw spectral response curves of the photodiodes of sensing units 612 of FIG. 6B. Plot 842 can represent the raw spectral response of sensing unit 612c (for a monochrome channel). Plot 844 can represent the raw spectral response of sensing unit 612e (for a red channel). Plot 846 can represent the raw response of sensing unit 612b (for a green channel). Plot 848 can represent the raw spectral response of sensing unit 612d (for a blue channel). Moreover, plot 850 can represent the raw spectral response of sensing unit 612a (for an IR channel). As shown in FIG. 8C, the raw spectral responses include both target components that are within the target wavelength ranges of the channels as well as crosstalk components that are outside the target wavelength ranges. For example, the raw spectral response of sensing unit 612b (of a green channel) has a main component within the target wavelength range 520 to 560 nm of the green channel, as well as crosstalk components that are outside the target wavelength range. The crosstalk components can be due to, for example, imperfect attenuation of other light components outside the target wavelength range by the green filter of sensing unit 612b. Moreover, the raw spectral response of sensing unit 612a (of an IR channel) has a main component within the target wavelength of, for example, 900 nm to 1000 nm, and a crosstalk component within the visible light wavelength range (e.g., 450 nm to 800 nm).

The crosstalk components can degrade the sensitivity of the photodiodes and introduce errors to the 2D and 3D imaging data, since an image generated from 2D or 3D sensing photodiodes can include components that are not in a target wavelength range. For example, as shown in plot 812, the charge generated by first photodiode 614 of sensing unit 612d is contributed primarily by light within the blue wavelength range 450 to 490 nm. But the charge may also be contributed by photons in the IR range (e.g., 800 to 900 nm) as crosstalk. Referring to the 2D and 3D sensing operations in FIG. 7A and FIG. 7B, because of the crosstalk a 2D blue image generated by image sensor may include IR pattern reflected by object 704. The IR pattern does not represent a visible light feature of object 704 and should not be captured in the 2D image. As a result, the crosstalk can introduce errors to the 2D image.

Figure 9:
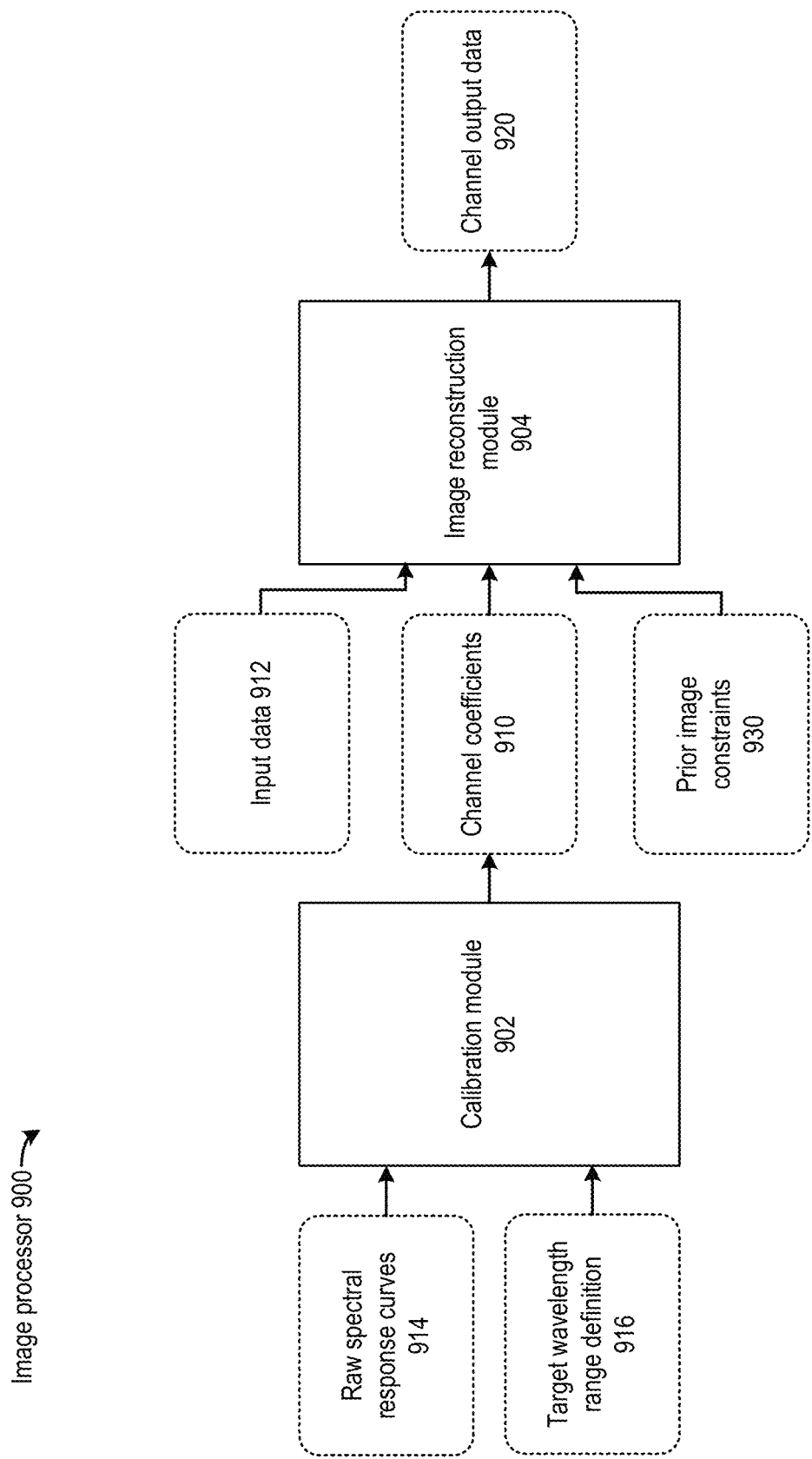
FIG. 9 illustrates an example of an image processor.

FIG. 9 illustrates an image processor 900 that can post-process the output of image sensor 600 to reduce the effect of crosstalk. As shown in FIG. 9, image processor 900 may include a calibration module 902, and an image reconstruction module 904. The various modules of image processor 900 can be implemented in an integrated circuit, such as an application specific integrated circuit (ASIC), an Field Programmable Gate Array (FPGA), etc. Image processor 900 can also be implemented by a set of software instructions stored on a non-transitory computer readable medium and executed by a hardware processor (e.g., a general purpose central processing unit, a digital signal processor, etc.). Calibration module 902 can generate, for each sensing channel (e.g., red, blue, green, IR, monochrome, etc.), a plurality of channel coefficients 910. Image reconstruction module 904 can combine channel coefficients 910 with input data 912 from an array of photodiodes associated with a pixel (e.g., sensing units 602a-d of FIG. 6A, sensing units 612 of super pixel 630 of FIG. 6B, etc.) to generate channel output data 920 for each channel. Channel coefficients 910 can maximize the main component of channel output data 920 (the component within the target wavelength range of the associated channel) with respect to the crosstalk component (the component outside the target wavelength range) of channel output data 920. For example, channel coefficients 910 for a red channel can be configured such that, when combined with input data 912 generated by first photodiodes 614 and second photodiodes 616 of sensing units 602a, 602c, and 602d (under green, red, and blue color filters) to generate channel output data 920 for the red channel, the main component of channel output data 920 within the target wavelength range of red visible light (e.g., 635 nm to 700 nm) can be maximized with respect to the crosstalk component of channel output data 920 outside the target wavelength range.

Figure 10A:
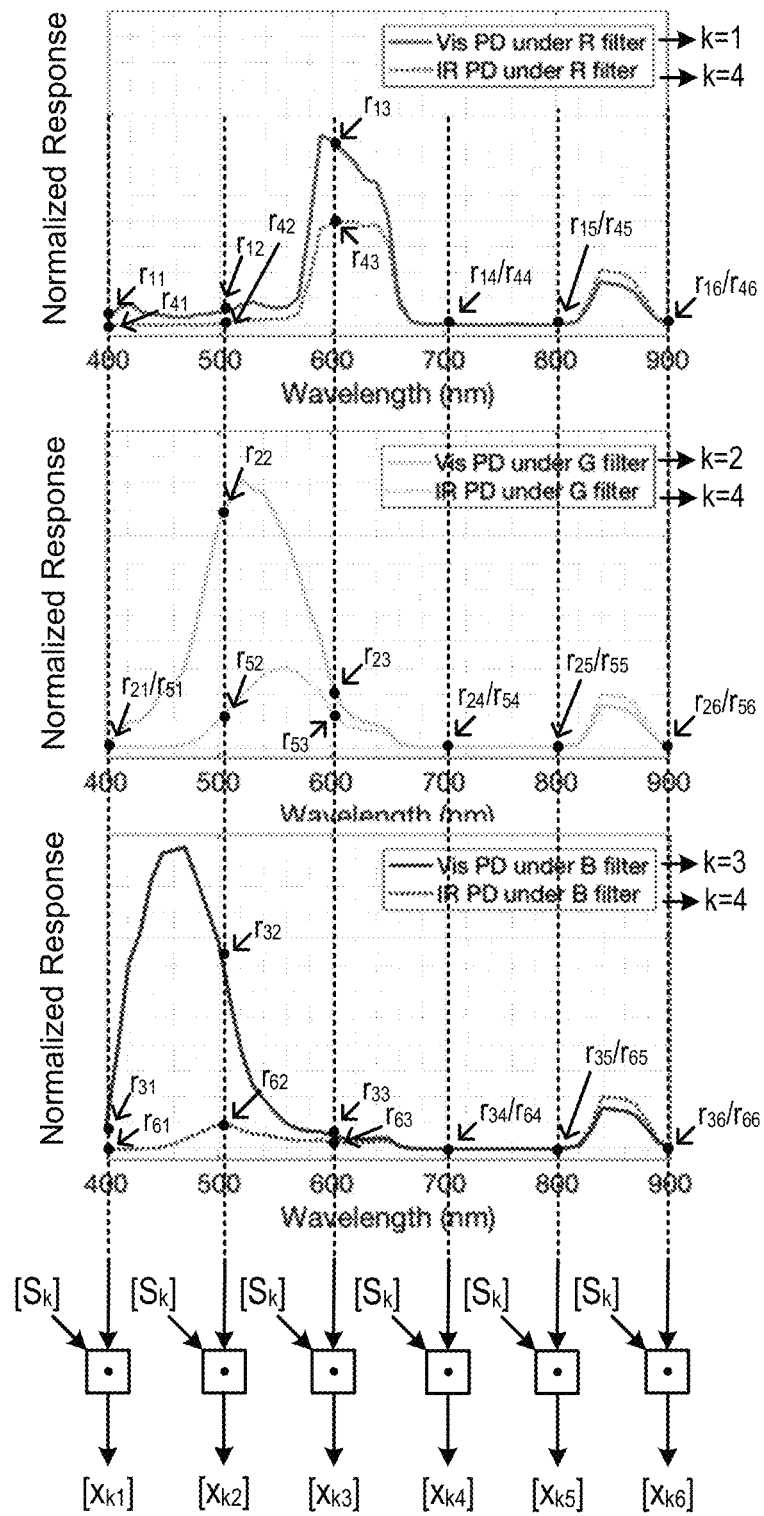
FIG. 10A and FIG. 10B illustrate example processes of generating channel coefficients by the image processor of FIG. 9 for image reconstruction.
Figure 10B:
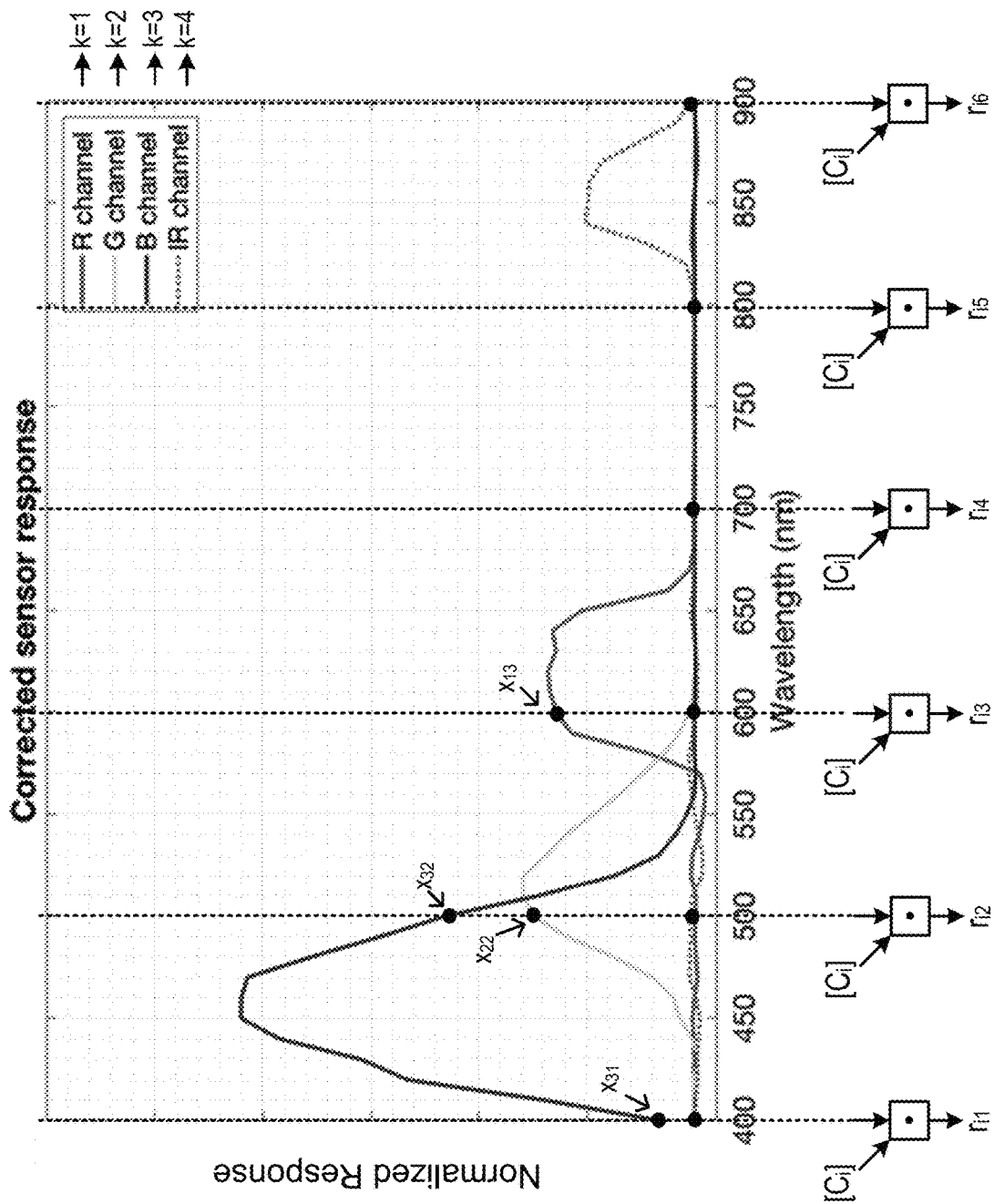

FIG. 10A and FIG. 10B illustrate example processes of generating channel coefficients 910 that can be performed by calibration module 902. In some examples, channel coefficients 910 can include channel separation coefficients. The channel separation coefficients, when combined with input data 912 to generate channel output data 920, can separate out the main components from the crosstalk components of input data 912 for each channel. Referring to FIG. 10A, the channel separation coefficients for a channel k can be represented by a matrix $S_k$. $S_k$ can include a plurality of channel separation coefficients $[s_{1k} \ s_{2k} \ldots s_{6k}]$, with each channel coefficient corresponding to a photodiode of six photodiodes associated with a pixel (e.g., first photodiode 614 and second photodiode 616 of sensing units 602a, 602c, and 602d) in FIG. 6A. Matrix $S_k$ can be combined with samples of the raw spectral response curves of the plurality of photodiodes at different wavelengths j, based on a dot product operation (represented by "." symbols in FIG. 10A), to generate a target spectral response curve for each channel. The dot operation can be represented by the following equation:

$$X_{kj} = \Sigma_{i=1}^{6} r_{ij} s_{ij} \quad \text{(Equation 1)}$$

In Equation 1, $x_{kj}$ (of matrix $X_{kj}$ in FIG. 10A) corresponds to a sample of the target spectral response of channel k at a wavelength associated with a label j formed by linearly combining the scaled samples of raw spectral responses $r_{ij}$ of six photodiodes (e.g., first photodiode 614 and second photodiode 616 of sensing units 602a, 602c, and 602d) at the wavelength j, with each sample scaled by a corresponding channel separation coefficient $s_{ik}$ of matrix $S_k$. FIG. 10B illustrates examples of the target spectral responses for each of red, blue, green, and IR channels. Comparing the target spectral responses with the raw spectral responses, it can be seen that the crosstalk components of the target spectral responses have been reduced.

The following table illustrates a mapping between the photodiodes and the labels i, as shown in FIG. 10A and FIG. 10B. First photodiode 614 and second photodiode 616 of sensing unit 602a are labelled as, respectively, "Vis G" and "IR G". First photodiode 614 and second photodiode 616 of sensing unit 602c are labelled as, respectively, "Vis R" and "IR R". First photodiode 614 and second photodiode 616 of sensing unit 602d are labelled as, respectively, "Vis B" and "IR B".

TABLE 1

| | Label i | | | | | |
|---|---|---|---|---|---|---|
| | 1 | 2 | 3 | 4 | 5 | 6 |
| Photodiodes | Vis R | Vis G | Vis B | IR R | IR G | IR B |

The following table provides a mapping between the wavelength samples and the labels j:

TABLE 2

| | Label j | | | | | |
|---|---|---|---|---|---|---|
| | 1 | 2 | 3 | 4 | 5 | 6 |
| wavelength | 400 nm | 500 nm | 600 nm | 700 nm | 800 nm | 900 nm |

The table below also defines the target wavelength ranges, represented by the lower wavelength $w_k^l$ and the upper wavelength $w_k^h$ for each channel k and the associated labels j for the computations of channel separation coefficients in the illustrative example of FIG. 10A and FIG. 10B:

TABLE 3

| | Target wavelength range $[w_k^l, w_k^h]$ | Out-of-band wavelength range | Labels (j) |
|---|---|---|---|
| Red channel (k = 1) | [500 nm, 700 nm] or [j = 2, j = 4] | 400 nm, 800 nm, 900 nm or j = 1, 5, and 6 | 2-4 |
| Green channel (k = 2) | [500 nm, 600 nm] or [j = 2, j = 3] | 400 nm, 700 nm-900 nm or j = 1 and 4-6 | 2-3 |
| Blue channel (k = 3) | [400 nm, 600 nm] or [j = 1, j = 3] | 700 nm-900 nm or j = 4-6 | 1-3 |
| IR channel (k = 4) | [700 nm, 900 nm] or [j = 4, j = 6] | 400 nm-600 nm or j = 1-3 | 4-6 |

The channel separation coefficients $S_k = [S_{1k} \ S_{2k} \ldots S_{6k}]$ for a channel k can be computed such that when combined with the raw spectral response curves (represented by $r_{ij}$) to generate a target spectral response curve (represented by $x_{kj}$) for a channel, the main component of target spectral response curve within the target wavelength range of that channel is maximized with respect to the crosstalk component of the target spectral response curve outside the target wavelength range of that channel.

The main component of a target spectral response of a channel k within the target wavelength range of the channel can be represented by the following Equation:

$$\Sigma_{j\in[w_k^l,w_k^h]}(x_{kj})^2 = S_k^T M_{in} S_k \quad \text{(Equation 2)}$$

In Equation 2, $(x_{kj})^2$ can represent the magnitude of the target spectral response for a channel k at a wavelength j. The left side of Equation 2 can represent the sum of the main components of the target spectral response evaluated at each wavelength sample j that is within the target wavelength range of channel k represented by $[w_k^l, w_k^h]$. On the right side of the equation, $M_{in}$ can be an in-band correlation matrix representing correlation values of components of the raw spectral responses $r_{ij}$ between different pairing of photodiodes i within the target wavelength range $[w_k^l, w_k^h]$ based on the following equation:

$$M_{i_1,i_2}^{in} = \Sigma_{j:w_j\in[w_k^l,w_k^h]} r_{i_1,j} r_{i_2,j} \quad \text{(Equation 3)}$$

As an illustrative example, referring back to Equation 3 and Tables above, the value of $M_{i=1,i=2}^{in}$ for channel k=1 (red channel) can be found by summation of products between the raw spectral response of photodiode i=1 (Vis R) and the raw spectral response of photodiode i=2 (Vis G) at wavelength j of 2, 3, and 4 (the target wavelength range of red channel).

In this example, $M_{in}$ can be a 6×6 matrix, as follows:

$$M_{in} = \begin{bmatrix} M_{i=1,i=1}^{in} & \cdots & M_{i=1,i=6}^{in} \\ \vdots & \ddots & \vdots \\ M_{i=6,i=1}^{in} & \cdots & M_{i=6,i=6}^{in} \end{bmatrix} \quad \text{(Equation 4)}$$

Moreover, the crosstalk component of the target spectral response of channel k outside the target wavelength range of the channel can be represented by the following Equation:

$$\Sigma_{j\notin[w_k^l,w_k^h]}(x_{kj})^2 = S_k^T M_{out} S_k \quad \text{(Equation 5)}$$

In Equation 5, $(x_{kj})^2$ can represent the magnitude of the target spectral response for channel k at a wavelength j. The left side of Equation 6 can represent the sum of the crosstalk components of the target spectral response evaluated at each wavelength sample j that is outside the target wavelength range of channel k represented by $[w_k^l, w_k^h]$. On the right side of the equation, $M_{out}$ can be an out-of-band correlation matrix representing correlation values of components of the raw spectral responses $r_{ij}$ between different pairing of photodiodes i outside the target wavelength range $[w_k^l, w_k^h]$ based on the following equation:

$$M_{i_1,i_2}^{out} = \Sigma_{j:w_j\notin[w_k^l,w_k^h]} r_{i_1,j} r_{i_2,j} \quad \text{(Equation 6)}$$

As an illustrative example, referring back to Equation 3 and the Tables above, the value of $M_{i=1,i=2}^{out}$ for channel k=1 (red channel) can be found by summation of products between the raw spectral response of photodiode i=1 (Vis R) and the raw spectral response of photodiode i=2 (Vis G) at wavelength j of 1, 5, and 6 (outside the target wavelength range of red channel).

In this example, $M_{out}$ can also be a 6×6 matrix, as follows:

$$M_{out} = \begin{bmatrix} M_{i=1,i=1}^{out} & \cdots & M_{i=1,i=6}^{out} \\ \vdots & \ddots & \vdots \\ M_{i=6,i=1}^{out} & \cdots & M_{i=6,i=6}^{out} \end{bmatrix} \quad \text{(Equation 7)}$$

The right hand side expression of Equation 2, $S_k^T M_{in} S_k$, can be obtained based on a matrix multiplication involving a transpose of channel separation coefficients matrix $S_k^T$, in-band correlation matrix $M_{in}$, and channel separation coefficients matrix $S_k$. Moreover, the right hand side expression of Equation 5, $S_k^T M_{out} S_k$, can be obtained based on a matrix multiplication involving a transpose of channel separation coefficients matrix $S_k^T$, out-of-band correlation matrix $M_{out}$, and channel separation coefficients matrix $S_k$. The channel separation coefficients matrix $S_k$ can be unknown variables in both expressions, and can be determined based on maximizing $S_k^T M_{in} S_k$ with respect to $S_k^T M_{out} S_k$. In some examples, the determination of channel separation coefficients matrix $S_k$ can be based on solving the following generalized-Eigen problem:

$$\max_{S_k} \frac{S_k^T M_{in} S_k}{S_k^T M_{out} S_k} \quad \text{(Equation 8)}$$

In some examples, channel coefficients 910 can include channel crosstalk coefficients. As to be described below, channel crosstalk coefficients and channel separation coefficients can be used in different image reconstruction processes to reconstruct an image for each channel. The channel crosstalk coefficients can represent the contributions to the main component and crosstalk component in the raw spectral response of a photodiode i by each channel k (including the channel associated with the photodiode i). Each photodiode i can be associated with a channel crosstalk coefficient matrix $C_i = [c_{1i}, c_{2i}, c_{3i}, c_{4i}]$, with each channel crosstalk coefficient corresponding to one of the four channels (k=1, 2, 3, or 4) in this example. The channel crosstalk coefficient matrix $c_i$ can be determined based on the following equation:

$$\min_{c_i} \sum_j \left( r_{ij} - \sum_{k=1}^{4} x_{kj} c_{ki} \right)^2 \quad \text{(Equation 9)}$$

In Equation 9, $r_{ij}$ can be a component of the raw spectral response of photodiode i sampled at wavelength j. Referring to FIG. 10B, the channel crosstalk coefficients $c_{ki}$ can be unknown variables and can be combined, with a dot product operation (represented by the "." Symbols in FIG. 10B) with the target spectral responses $x_{kj}$ for all channels (k=1 to 4) to obtain $r_{ij}$. Target spectral responses $x_{kj}$ can be determined based on the channel separation coefficients $S_k$ as in Equation 1 above. The channel crosstalk coefficients $c_{ki}$ can be determined by solving Equation 9 such that a difference between $r_{ij}$ and the combination of channel crosstalk coefficients $c_{ki}$ and target spectral responses $x_{kj}$ is at the minimum.

While Equations 1 to 9 above are provided based on the example architecture of sensing units 602 of FIG. 6A and the raw spectral responses of sensing units 602 illustrated in FIG. 8B, it is understood that the techniques described above for computing of channel separation coefficients and channel crosstalk coefficients are generic and independent from the sensor architecture. For example, Equations 1 to 9 can be adapted to compute the channel separation coefficients based on the raw spectral response curves of sensing units 612 as illustrated in FIG. 8C, and to compute the channel crosstalk coefficients of sensing units 612. For example, for sensing units 612, a target spectral response $x_{kj}$ for a channel k and sampled at wavelength j can be computed based on the raw spectral responses of, for example, a set of sensing units 612 associated with a super pixel (e.g., super pixel 630). The in-band and out-of-band correlation matrices $M_{in}$ and $M_{out}$ can be determined based on the raw spectral responses of sensing units 612a, 612b, 612d, and 612e, and the channel separation coefficients can be determined based on the correlation matrices as described above.

Referring back to FIG. 9, calibration module 902 can receive data representing raw spectral response curves 914 for a group of sensing units of which outputs are to be combined to form the channel outputs of a pixel. Spectral response curves 914 may include, for example, plots 812-832 of FIG. 8B, plots 842-840 of FIG. 8C, etc., whereas the group of sensing units may include, for example, sensing units 602a-d of FIG. 6A, sensing units 612a-f of FIG. 6B, etc. Calibration module 902 can also receive the target wavelength range definitions 916 for each channel similar to Table 3 above. Calibration module 902 can then generate channel coefficients 910, which may include channel separation coefficients and/or channel crosstalk coefficients for each channel, based on Equations 1 to 9 above. Calibration module 902 can then provide channel separation coefficients and/or channel crosstalk coefficients for each channel to image reconstruction module 904 to perform image reconstruction for each channel.

Image reconstruction module 904 can combine input data 912 from the sensing units with channel coefficients 910 of a channel to generate channel output data 920 for that channel using different techniques.

Figure 11:
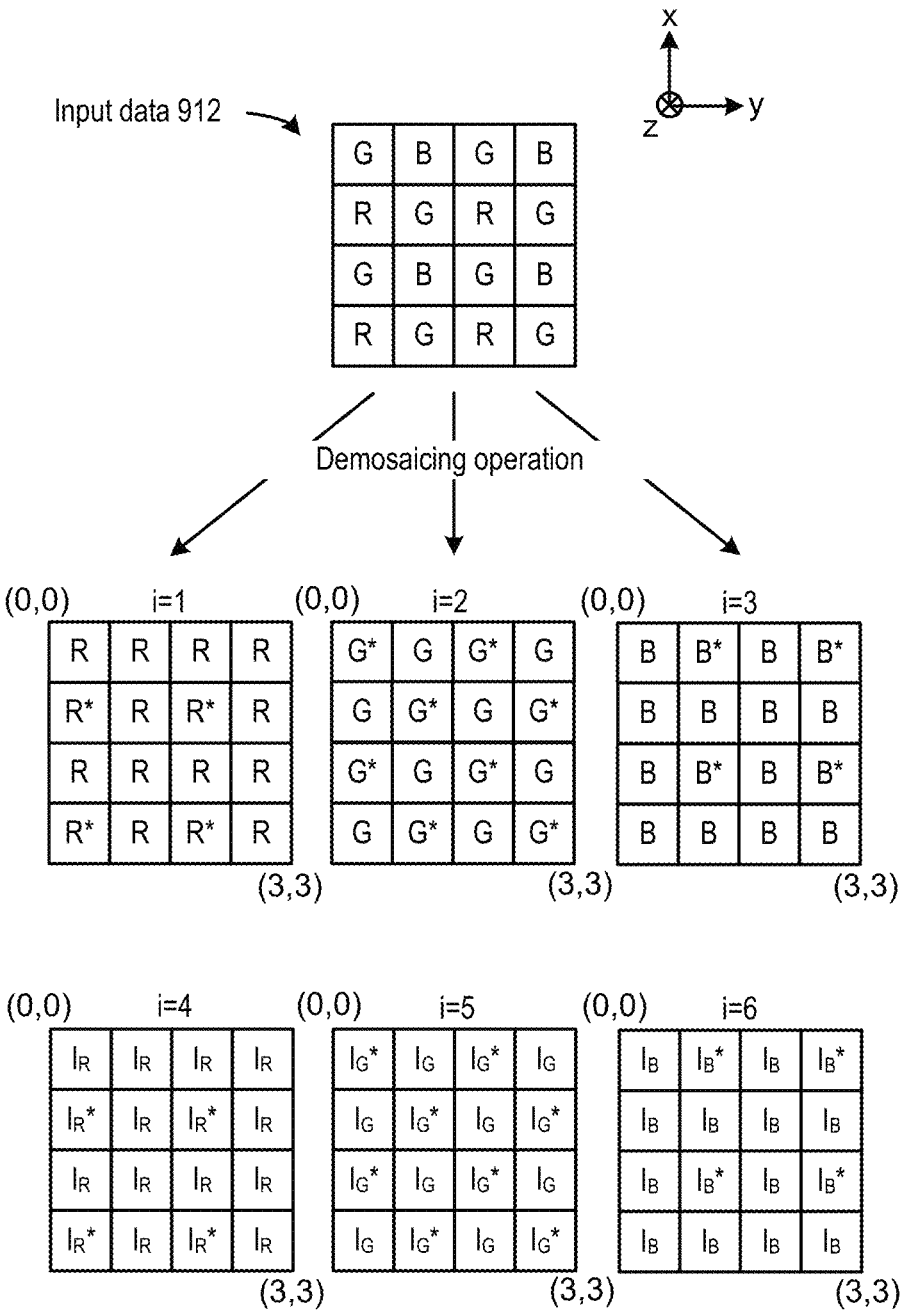
FIG. 11 illustrates an example process of demosaicing operation.

In one example, image reconstruction module 904 can generate channel output data 920 based on directly combining input data 912 with channel separation coefficients. The operation can include two steps. As a first step, image reconstruction module 904 can perform a demosaicing operation on input data 912 to generate a pre-processed image frame for each channel. FIG. 11 illustrates an example of a demosaicing operation performed on input data 912 from sensing units 602 of FIG. 6A. As shown in FIG. 11, first photodiode 614 of each of sensing units 602 at any given (x, y) coordinates can output data associated with a green channel (represented by "G"), a red channel (represented by "R"), or a blue channel (represented by "B") based on the color filters on the sensing units. Moreover, second photodiode 616 of each of sensing units 602 at any given (x, y) coordinates can output data associated with an infrared channel which may also include crosstalk of different components of visible light. The infrared channel can be subdivided into an "$I_R$" (having crosstalk of red light) channel, an "$I_G$" (having crosstalk of green light) channel, and an "$I_B$" (having crosstalk of blue light) channel. The input data 912 in FIG. 11 can be separated into six image frames, each associated with a label i based on Table 1 above. Each image frame includes pixels that are generated directly from part of input data 912 associated with one of red, green, blue, $I_R$, $I_G$, and $I_B$ channels and are marked by an asterisk "*". For example, a pixel at coordinates (0, 1) of image frame i=1 (red channel) can be directly generated from output of sensing unit 602 at coordinates (0, 1) because that sensing unit has a red filter for red channel sensing. On the other hand, some other pixels of image frame i=1 may not have red channel outputs from the corresponding sensing units 602, such as a pixel at coordinates (0, 0). A demosaicing operation can be performed to fill those pixels with red channel data. The demosaicing operation can include, for example, interpolation, filtering, etc. among pixels associated with red channel sensing (e.g., pixels at coordinates (0, 1), (2, 1), etc.) to generate, for example, the red channel output of pixel at coordinates (0, 0). With such arrangements, six pre-processed image frames can be generated, with each pre-processed image frame having every pixel associated with data of a particular channel.

As a second step, image reconstruction module 904 can then generate channel output data 920 for a channel (e.g., one of red, green, blue, IR, etc.) based on combining the six pre-processed image frames with channel coefficient 910 of that channel using different techniques. In one example, image reconstruction module 904 can generate channel output data 920 for the channel based on combining the six pre-processed image frames with channel coefficient 910 directly with the channel separation coefficients $S_k$ (e.g., [$s_{1k}$ $s_{2k}$ ... $s_{6k}$] for the six photodiodes in sensing units 602a, 602c, and 602d) of the channel k based on the following equation:

$$h_k(x,y) = \Sigma_{i=1}^{6} g_i(x,y) s_{ik} \quad \text{(Equation 10)}$$

In Equation 10, $g_i(x, y)$ is part of input data 912 and represents the sensing unit output at coordinates (x, y) of an image frame i of FIG. 11, whereas $h_k(x, y)$ represents channel output data 920 (also referred to as "hidden image") at the corresponding coordinates (x, y) for each channel k. Each sensing unit output can be scaled by a corresponding channel separation coefficient $s_{ik}$ of the channel k, and the scaled outputs can be summed to generate channel output data 920. As explained above, the channel separation coefficients can maximize the main component within the target wavelength range of the channel with respect to the crosstalk component of channel output data 920. As a result, the out-of-band crosstalk components in a reconstructed image for a channel can be substantially reduced or even eliminated. An image reconstruction operation based on Equation 10 can be performed relatively efficiently as it requires relatively few arithmetic operations and does not incur huge computation and memory resources.

Besides direct combination of input data 912 with channel separation coefficients, image reconstruction module 904 can also generate channel output data 920 based on channel crosstalk coefficients $C_i$. Specifically, image reconstruction module 904 can generate a first image model for an RGB image and a second image model for an IR image based on input data 912. Image reconstruction module 904 can determine the channel output data 920 $h_k(x, y)$ for each channel k such that when the channel output data are combined with channel crosstalk coefficients $C_i$ to generate an RGB image and an IR image, the RGB image and the IR image can match the first and second image models to a certain degree.

Specifically, the input data $g_i(x, y)$ of demosaiced image frame i and the channel output data $h_k(x, y)$ can be related based on the following equation:

$$g_i(x,y) = \Sigma_{k=1}^{4} h_k(x,y) c_{ik} \quad \text{(Equation 11)}$$

Based on $g_i(x, y)$, which is part of the input data 912 and represents the output of a photodiode of a sensing unit at coordinates (x, y) and associated with labels i=1 to 6. A first image model and a second image model can be determined based on the following equation:

$$f_t(x,y) = \Sigma_i g_i(x,y) m_{it}(x,y) + \text{noise} \quad \text{(Equation 12)}$$

In Equation 12, $f_t(x, y)$ can represent a pixel value at coordinates (x, y) given by the image model (also referred to as "observed image"). The index t can indicate which of the first or second image models to be used to compute the pixel value. The first image model for an RGB image can be associated with t=1, whereas the second image model for an IR image can be associated with t=2. $m_{it}(x, y)$ can be a mask bit indicating whether a particular photodiode at coordinates (x, y) provides data for an RGB image or for an IR image and has the label i. For example, referring back to input data 912 of FIG. 11, the distribution of mask bit $m_{it}(x, y)$ for i=1 (first photodiode 614 under the red filter, "VIS R" in Table 1 above) for the first image model $f_t(x, y)$ (with t equals 1) can be represented by the following table:

TABLE 4

| G | B | G | B |
|---|---|---|---|
| 0 | 0 | 0 | 0 |
| R | G | R | G |
| 1 | 0 | 1 | 0 |
| G | B | G | B |
| 0 | 0 | 0 | 0 |
| R | G | R | G |
| 1 | 0 | 1 | 0 |

Moreover, the distribution of mask bit $m_{it}(x, y)$ for i=1 and for the second image model (with t equals 2) can be represented by the following table:

TABLE 5

| G | B | G | B |
|---|---|---|---|
| 0 | 0 | 0 | 0 |
| R | G | R | G |
| 0 | 0 | 0 | 0 |
| G | B | G | B |
| 0 | 0 | 0 | 0 |
| R | G | R | G |
| 0 | 0 | 0 | 0 |

The "noise" term in Equation 12 can represent uncertainties attributed to, for example, random arrival of photons, dark current, quantization errors, measurement errors, etc.

The channel output data 920 at the corresponding coordinates (x, y) for each channel k, $h_k(x, y)$, can be determined by solving the following minimization problem:

$$\Sigma_t \Sigma_{x,y} (f_t(x,y) - \Sigma_{i=1}^{6} \Sigma_{k=1}^{4} m_{it}(x,y) h_k(x,y) c_{ik})^2 + \rho(h) \quad \text{(Equation 13)}$$

In Equation 13, the unknown values of channel output data 920, represented by $h_k(x, y)$, can be combined with the mask bit $m_{it}(x, y)$ and the channel crosstalk coefficients $c_{ik}$ to form a function which describes the relationship between the pixel values and channel output data 920. The pixel values can be of an RGB image or of an IR image. The channel output data 920 can be determined such that the pixel values for an RGB image are the closest to corresponding pixel values in the first image model, and the pixel values for an IR image are the closest to the corresponding pixel values in the second image model, by minimizing the differences between the pixel values and the corresponding pixel values in the respective image model represented in Equation 13.

In addition, the minimization problem can also include a constraint $\rho(h)$ from a prior image. A typical choice of $\rho(h)$ is L2 norm on its image gradients based on the following equations:

$$\rho(h) = \Sigma_k \alpha_k \Sigma_{x,y} |\Delta h_k(x,y)|^2 \quad \text{(Equation 14)}$$

$$\Delta h_k(x,y) = [h_k(x+1,y) - h_k(x,y), h_k(x,y+1) - h_k(x,y)] \quad \text{(Equation 15)}$$

The constrains can be provided to facilitate convergence when solving the minimization problem. For example, the constraints can impose a limit on a rate of change of pixel values between two pixels, and the rate can be learned from prior images using, for example, neural network models, and the constraints can reflect a maximum image gradient in a typical image. With such arrangements, it becomes more likely that image reconstruction module 904 can generate the proper channel output data 920. The image reconstruction operations in Equations 12-15 can provide more accurate channel output data 920, but may require more computation and memory resources. Referring back to FIG. 9, the constraints can be part of prior image constraints 930.

Figure 12:
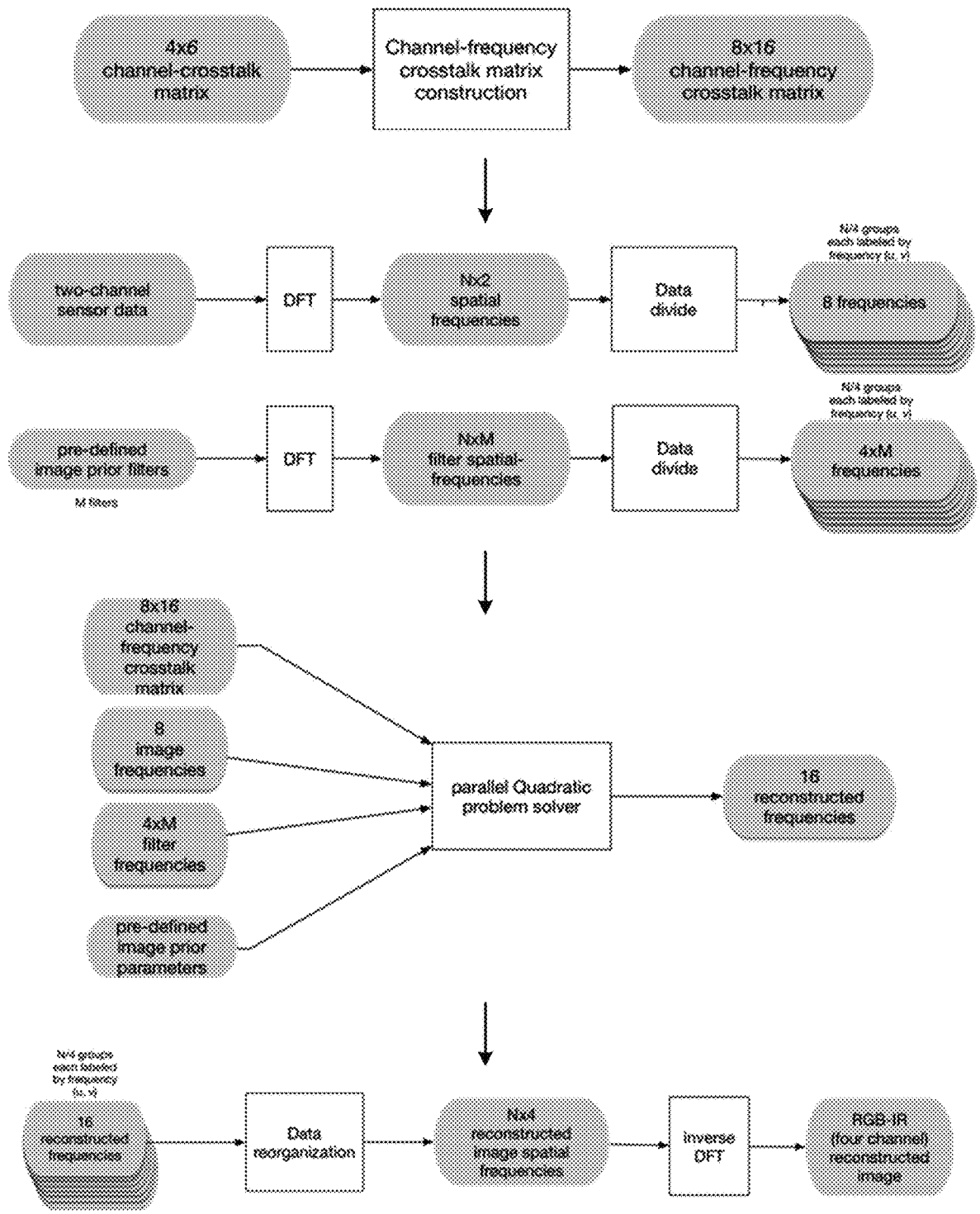
FIG. 12 illustrates an example image reconstruction process in Fourier domain.

In some examples, the image reconstruction operations of Equations 11-14 can be performed in Fourier domain, which can allow much faster parallel computation. FIG. 12 illustrates an example flowchart of performing an image reconstruction operation in the Fourier domain. Specifically, Equation 11 can be represented in the Fourier domain, as follows:

$$G_i(u,v) = \Sigma_{k=1}^{4} H_k(u,v) c_{ik} \quad \text{(Equation 16)}$$

In Equation 16, G represents the Fourier Transform results of the demosaiced image $g_i(x, y)$, H represents the Fourier Transform results of the channel output data $h_k(x, y)$, whereas u and v represent discrete frequencies in the first quadrant of the Fourier spectrum.

The formation of image models $f_t(x, y) = \Sigma_i g_i(x, y) m_{it}(x, y)$ can correspond to blending of four disjoint frequency bands in the Fourier domain. Specifically, $F_t(u, v)$, the Fourier domain equivalent of image model $f_t(x, y)$, can be a linear combination of $G_i(u, v)$, $G_i(u+\pi, v)$, $G_i(u, v+\pi)$, $G_i(u+\pi, v+\pi)$, each of which can be generated by a Fourier transform operation of $g_i(x, y)$. $F_t(u, v)$ includes a linear combination of $G_i$ with i equals 1, 2, or 3 for t equals 1 as follows:

$$\begin{bmatrix} F_1(u, v) \\ F_1(u + \pi, v) \\ F_1(u, v + \pi) \\ F_1(u + \pi, v + \pi) \end{bmatrix} = \frac{1}{4} \times$$

$$\begin{bmatrix} 1 & -1 & -1 & 1 & 2 & 2 & 0 & 0 & 1 & -1 & -1 & 1 \\ -1 & 1 & 1 & -1 & 2 & 2 & 0 & 0 & -1 & 1 & 1 & -1 \\ -1 & 1 & 1 & -1 & 0 & 0 & 2 & 2 & -1 & 1 & 1 & -1 \\ 1 & -1 & -1 & 1 & 0 & 0 & 2 & 2 & 1 & -1 & -1 & 1 \end{bmatrix} \times$$

$$VG1$$

(Equation 17)

In Equation 17, VG1 can be a 8×1 column vector of [G1(u, v), G1(u+π, v), G1(u, v+π), G1(u+π, v+π), G2(u, v), G2(u+π, v), G2(u, v+π), G2(u+π, v+π), G3(u, v), G3(u+π, v), G3 (u, v+π), G3 (u+π, v+π)].

Moreover, $F_t(u, v)$ includes a linear combination of $G_i$ with i equals 4, 5, or 6 for t equals as follows:

$$\begin{bmatrix} F_2(u, v) \\ F_2(u + \pi, v) \\ F_2(u, v + \pi) \\ F_2(u + \pi, v + \pi) \end{bmatrix} = \frac{1}{4} \times$$

$$\begin{bmatrix} 1 & -1 & -1 & 1 & 2 & 2 & 0 & 0 & 1 & -1 & -1 & 1 \\ -1 & 1 & 1 & -1 & 2 & 2 & 0 & 0 & -1 & 1 & 1 & -1 \\ -1 & 1 & 1 & -1 & 0 & 0 & 2 & 2 & -1 & 1 & 1 & -1 \\ 1 & -1 & -1 & 1 & 0 & 0 & 2 & 2 & 1 & -1 & -1 & 1 \end{bmatrix} \times$$

$$\frac{VG2}{4}$$

(Equation 18)

In Equation 18, VG2 can be a 8×1 column vector of [G4(u, v), G4(u+π, v), G4(u, v+π), G4(u+π, v+π), G5(u, v), G5(u+π, v), G5(u, v+π), G5(u+π, v+π), G6(u, v), G6(u+π, v), G6(u, v+π), G6(u+π, V+π)].

Equation 13 above can be transformed to the Fourier domain as follows:

$$\Sigma_{u,v}\Sigma_t(\Sigma_k(M_{tk}^{LL}H_k(u,v)+M_{tk}^{LH}H_k(u+\pi,v)+M_{tk}^{HL}H_k(u,v+\pi)+M_{tk}^{HH}H_k(u+\pi,v+\pi))+F_t(u,v))^2+\rho(h) \quad \text{(Equation 19)}$$

In Equation 17, the matrix M can be a 8×16 matrix that linearly transforms the Fourier transform of hidden image (H) to the Fourier Transform of observed image ($F_1$ and $F_2$), as follows:

$$\begin{bmatrix} F_1(u, v) \\ F_1(u+\pi, v) \\ F_1(u, v+\pi) \\ F_1(u+\pi, v+\pi) \\ F_2(u, v) \\ F_2(u+\pi, v) \\ F_2(u, v+\pi) \\ F_2(u+\pi, v+\pi) \end{bmatrix} = M \times \begin{bmatrix} H_1(u, v) \\ H_1(u+\pi, v) \\ H_1(u, v+\pi) \\ H_1(u+\pi, v+\pi) \\ \ldots \\ H_4(u, v) \\ \ldots \\ H_4(u+\pi, v+\pi) \end{bmatrix} \quad \text{(Equation 20)}$$

In Equation 19, $M_{tk}^{LL}$ can refer to portion of matrix M of Equation 20 that transforms $F_t$ to $H_k$ for the frequency (u, v). $M_{tk}^{LH}$ can refer to portion of matrix M of Equation 20 that transforms $F_t$ to $H_k$ for the frequency (u, v+π). $M_{tk}^{HL}$ can refer to portion of matrix M of Equation 20 that transforms $F_t$ to $H_k$ for the frequency (u+π, v). Moreover, $M_{tk}^{HH}$ can refer to portion of matrix M of Equation 20 that transforms $F_t$ to $H_k$ for the frequency (u+π, v+π). Matrix can have a layout based on $M_{tk}^{LL}$, $M_{tk}^{LH}$, $M_{tk}^{HL}$, and $M_{tk}^{HH}$ as follows:

$$M = \begin{bmatrix} M_{11}^{LL}(u, v) & M_{11}^{LL}(u+\pi, v) & M_{11}^{LL}(u, v+\pi) & M_{11}^{LL}(u+\pi, v+\pi) & \ldots & M_{14}^{LL}(u+\pi, v+\pi) \\ M_{11}^{LH}(u, v) & M_{11}^{LH}(u+\pi, v) & \ldots & \ldots & \ldots & \ldots \\ M_{11}^{HL}(u, v) & M_{11}^{HL}(u+\pi, v) & \ldots & \ldots & \ldots & M_{14}^{HL}(u+\pi, v+\pi) \\ M_{11}^{HH}(u, v) & M_{11}^{HH}(u+\pi, v) & \ldots & \ldots & \ldots & \ldots \\ M_{21}^{LL}(u, v) & M_{21}^{LL}(u+\pi, v) & \ldots & \ldots & \ldots & \ldots \\ M_{21}^{LH}(u, v) & \ldots & \ldots & \ldots & \ldots & \ldots \\ M_{21}^{ML}(u, v) & \ldots & \ldots & \ldots & \ldots & \ldots \\ M_{21}^{HH}(u, v) & \ldots & \ldots & \ldots & \ldots & M_{24}^{HH}(u+\pi, v+\pi) \end{bmatrix} \quad \text{(Equation 21)}$$

M can be a function of the channel coefficients $c_{ik}$ as follows:

$$M = \begin{bmatrix} S & 0 \\ 0 & S \end{bmatrix} \times \begin{bmatrix} c_{11} \times I4 & c_{12} \times I4 & c_{13} \times I4 & c_{14} \times I4 \\ c_{21} \times I4 & c_{22} \times I4 & c_{23} \times I4 & c_{24} \times I4 \\ \ldots & \ldots & \ldots & \ldots \\ c_{61} \times I4 & c_{62} \times I4 & c_{63} \times I4 & c_{64} \times I4 \end{bmatrix} \quad \text{(Equation 22)}$$

In Equation 22, I4 can be a 4×4 identity matrix, whereas S can be a matrix as follows:

$$S = \frac{1}{4} \times \begin{bmatrix} 1 & -1 & -1 & 1 & 2 & 2 & 0 & 0 & 1 & -1 & -1 & 1 \\ -1 & 1 & 1 & -1 & 2 & 2 & 0 & 0 & -1 & 1 & 1 & -1 \\ -1 & 1 & 1 & -1 & 0 & 0 & 2 & 2 & -1 & 1 & 1 & -1 \\ 1 & -1 & -1 & 1 & 0 & 0 & 2 & 2 & 1 & -1 & -1 & 1 \end{bmatrix} \quad \text{(Equation 23)}$$

Referring back to Equation 19, constraint ρ(h) can be in Fourier domain, as follows:

$$\rho(h)=\Sigma_k \alpha_k \Sigma_{u,v} \rho_{uv}(H_k(u,v)) \quad \text{(Equation 24)}$$

The hidden image frequencies can be solved in parallel by solving for $H_k(u, v)$ which minimizes the following equation:

$$\Sigma_t(\Sigma_k(M_{tk}^{LL}H_k(u,v)+M_{tk}^{LH}H_k(u+\pi,v)+M_{tk}^{LH}H_k(u,v+\pi)+M_{tk}^{HH}H_k(u+\pi,v+\pi))-[F_t(u,v),F_t(u+\pi,v),F_t(u,$$

$$v+\pi),F_r(u+\pi,v+\pi)]^T)^2+\Sigma_k\alpha_k(\rho_{uv}(H_k(u,v))+\rho_{uv}(H_k(u+\pi,v)+\rho_{uv}(H_k(u,v+\pi)+\rho_{uv}(H_k(u+\pi,v+\pi)))$$ (Equation 25)

Parallel processing based on Equation 25 can be achieved by, for example, assigning a process thread to a frequency index (u, v). Each thread can solve, for example, 16 hidden frequencies. Assuming the sensor has a pixel array of M*N super pixels per channel (depth), the sensor image can have 2M×2N×2 raw pixels, and 2M×2N×4 unknown pixels are to be solved. Accordingly, in the Fourier domain, responses of 2M×2N×2 frequencies are used to solve for responses of 2M×2N×4 frequencies.

Referring to the above equation 20 where [F1(u, v), F2(u+pi, v+pi)]=M[H1(u, v), . . . H(u+pi, v+pi)], responses of 16 unknown frequencies are solved from responses of 8 observed frequencies a time (notice M matrix above is of size 8×16). Therefore, M×N problems are solved in parallel, all of which share the same M, but differ in the vector F. Therefore, M×N groups can be formed and can be solved in parallel. As an illustrative example, for an input image of size 400×200×2, we need to solve 200×100=20000 such problems in parallel to obtain the Fourier transform of an hidden image of size 400×200×4.

Figure 13:
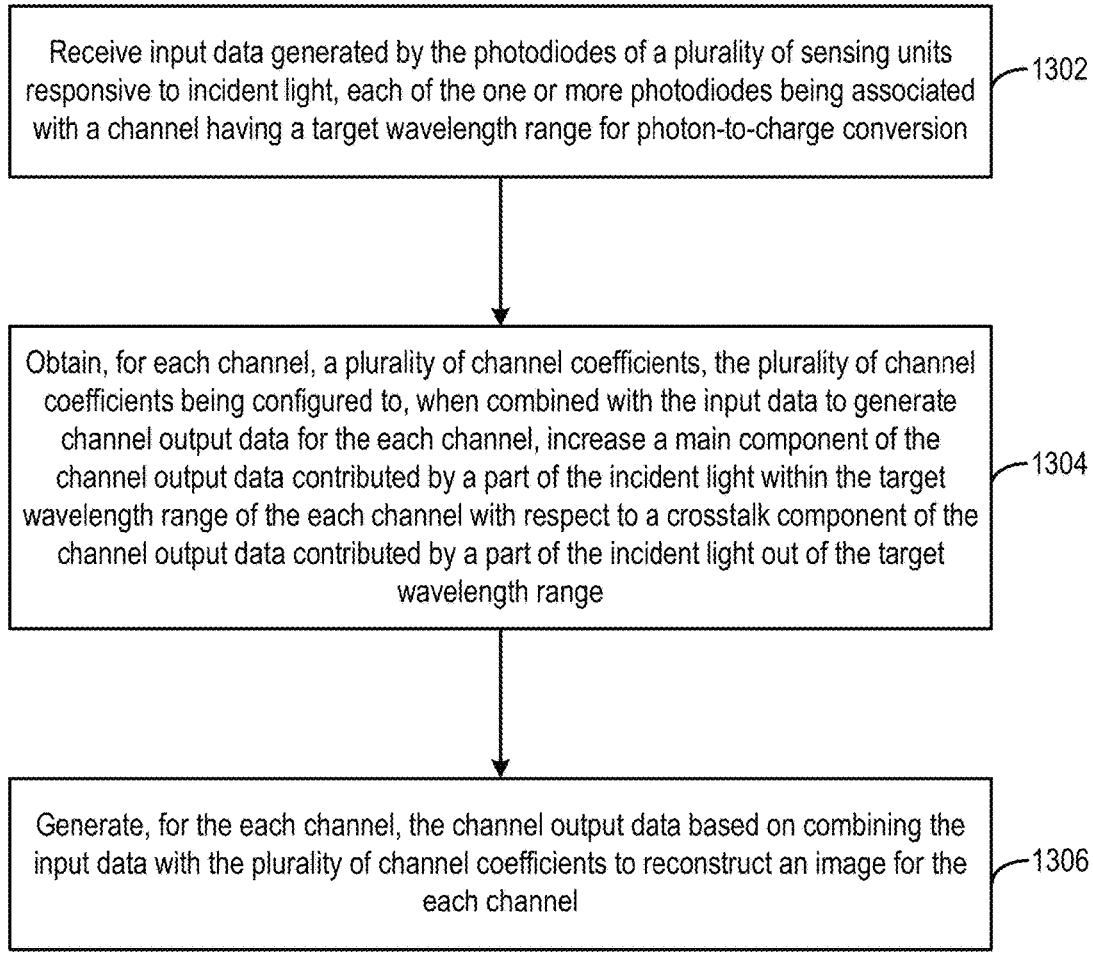
FIG. 13 illustrates an example of an image reconstruction process.

FIG. 13 illustrates a flowchart of a method 1300 of reconstructing images from sensor output data based on the techniques described above. Method 1300 can be performed by, for example, image processor 900 of FIG. 9 which is coupled with image sensor 600 having a plurality of sensing units. Each sensing unit comprises one or more photodiodes, with each of the one or more photodiodes being associated with a channel having a target wavelength range for photon-to-charge conversion. In some examples, each sensing unit includes two photodiodes forming a stack, and an optical filter to set a target wavelength range of visible light to be sensed by one of the photodiodes, whereas the other photodiode in the stack is to sense infrared light. In some examples, each sensing unit includes a single photodiode and an optical filter to select a target wavelength range of light (which can be visible light or infrared light) to be sensed by the single photodiode.

Method 1300 starts with step 1302, in which the image processor receive input data generated by the photodiodes of the plurality of sensing units responsive to incident light. The input data can represent, for example, a quantity of charge generated by each of the photodiodes within an exposure period and digitized by an analog-to-digital converter. The input data can be presented by $g_i(x, y)$ in the equations above.

In step 1304, the image processor can obtain, for each channel, a plurality of channel coefficients, the plurality of channel coefficients being configured to, when combined with the input data to generate channel output data for the each channel, increase a main component of the channel output data contributed by a part of the incident light within the target wavelength range of the each channel with respect to a crosstalk component of the channel output data contributed by a part of the incident light out of the target wavelength range.

Specifically, the plurality of channel coefficients can be received from a calibration module (e.g., calibration module 902) which can be part of external to the image processor. The Calibration module can obtain data representing a raw spectral response curve of each photodiode of the photodiodes, such as those shown in FIG. 8B and FIG. 8C. Each raw spectral response curve can include target spectral components within the target wavelength range of the channel as well as crosstalk spectral components outside the target wavelength range of the channel. The raw spectral response curves can be represented by $r_{ij}$ in the equations above. The raw spectral response curves data can be combined with the plurality of channel coefficients to generate a target spectral response curve for the each channel.

In some examples, the plurality of channel coefficients may include a plurality of channel separation coefficients, represented by $S_k$ in the equations above. The calibration module can determine the plurality of channel separation coefficients that increases or otherwise maximizes a first portion of the target spectral response curve within the target wavelength range of the each channel with respect to a second portion of the target spectral response curve out of the target wavelength range of the each channel based on, for example, Equations 1-8 above.

In some examples, the plurality of channel coefficients may include a plurality of channel crosstalk coefficients, represented by $C_i$ in the Equations above. The plurality of channel crosstalk coefficients can indicate crosstalk components of the channel output data of the each channel contributed by the plurality of photodiodes. The plurality of channel crosstalk coefficients of the each channel is determined based on minimizing a difference between the spectral response curve of the each channel and a combination of the plurality of channel crosstalk coefficients of the each channel and the target spectral response curves, based on Equation 9 above.

In step 1306, the image processor can generate, for the each channel, the channel output data based on combining the input data with the plurality of channel coefficients to reconstruct an image for the each channel. In a case where the channel coefficients comprise channel separation coefficients, the image processor can multiply the input data with the channel separation coefficients as described with respect to Equation 10 above. In a case where the channel coefficients comprise channel crosstalk coefficients, the image processor can perform demosaicing operations on the input data and generate the channel output data based on the demosaiced input data, an image formation model, as well as prior image constraints as described above with respect to Equations 11-25. In some examples, the generation of the channel output data can be performed in the Fourier domain to facilitate parallel processing, as described above.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What we claim is:

1. An apparatus, comprising:
a plurality of sensing units, each sensing unit comprising one or more photodiodes, each of the one or more photodiodes being associated with a channel having a target wavelength range for photon-to-charge conversion; and
an image processor configured to:
receive input data generated by the photodiodes of the plurality of sensing units responsive to incident light;
obtain, for each channel, a plurality of channel coefficients, the plurality of channel coefficients being configured to, when combined with the input data to generate channel output data for the each channel, increase a main component of the channel output data contributed by a part of the incident light within the target wavelength range of the each channel with respect to a crosstalk component of the channel output data contributed by a part of the incident light out of the target wavelength range, wherein the plurality of channel coefficients, when combined with a raw spectral response curve of each of the one or more photodiodes to obtain a target spectral response curve of the photodiode, maximizes a first portion of the target spectral response curve within the target wavelength range of each channel with respect to a second portion of the target spectral response curve out of the target wavelength range of each channel; and
generate, for the each channel, the channel output data based on combining the input data with the plurality of channel coefficients to reconstruct an image for the each channel.

2. The apparatus of claim 1, further comprising a calibration module configured to:
obtain data representing the raw spectral response curve of each photodiode of the photodiodes, the raw spectral response curve representing a spectral response of the each photodiode operating in the respective sensing unit to light of a wavelength range, the data representing the raw spectral response curves being combinable with the plurality of channel coefficients of the each channel to generate the target spectral response curve for the each channel; and
determine, for the each channel, a plurality of channel separation coefficients that maximizes the first portion of the target spectral response curve within the target wavelength range of the each channel with respect to the second portion of the target spectral response curve out of the target wavelength range of the each channel, wherein the plurality of channel separation coefficients for the each channel is part of the plurality of channel coefficients for the each channel.

3. The apparatus of claim 2, wherein the raw spectral response curve of each photodiode includes a first portion within the target wavelength of the channel associated with the each photodiode and a second portion out of the target wavelength out of the channel associated with the each photodiode;
wherein the calibration module is configured to, for the each channel:
determine, for each raw spectral response of the raw spectral responses, a first portion that is within the target wavelength range of the each channel and a second portion that is outside the target wavelength range;
determine an in-band matrix based on correlations among the first portions of the raw spectral responses;
determine an out-of-band matrix based on correlations among the second portions of the raw spectral responses; and
determine the plurality of channel separation coefficients that increases a first combination of the in-band matrix and the plurality of channel separation coefficients with respect to a second combination of the out-of-band matrix and the plurality of channel separation coefficients.

4. The apparatus of claim 3, wherein the first combination comprises a matrix multiplication of a transpose of the plurality of channel separation coefficients, the in-band matrix, and the plurality of channel separation coefficients; and
wherein the second combination comprises a matrix multiplication of the transpose of the plurality of channel separation coefficients, the out-of-band matrix, and the plurality of channel separation coefficients.

5. The apparatus of claim 4, wherein the determination of the plurality of channel coefficients comprises solving a generalized-Eigenvalue problem of maximizing a ratio between the first combination and the second combination.

6. The apparatus of claim 5, wherein the calibration module is configured to:
determine, for the each channel, the target spectral response curve based on combining the raw spectral response curves with the plurality of channel coefficients of the each channel; and
determine, for the each channel, a plurality of channel crosstalk coefficients that indicate crosstalk components of the channel output data of the each channel contributed by the photodiodes;
wherein the plurality of channel crosstalk coefficients of the each channel is determined based on minimizing a difference between the spectral response curve of the each channel and a combination of the plurality of channel crosstalk coefficients of the each channel and the target spectral response curves; and wherein the plurality of channel separation coefficients for the each channel is part of the plurality of channel coefficients for the each channel.

7. The apparatus of claim 2, wherein the image processor is configured to:
generate pre-processed input data for the each channel based on performing a demosaicing operation on the input data; and
generate, for the each channel, the channel output data based on combining the pre-processed input data of the each channel with the plurality of channel separation coefficients of the each channel to reconstruct an image for the each channel.

8. The apparatus of claim 7, wherein the image processor is configured to:
determine, based on the input data, a first image model associated with a visible light wavelength range and a second image model associated with an infra-red light wavelength range; and
generate the channel output data for the each channel based on minimizing, under a pre-determined constraint, a first difference between the first image model and a first combination of a first part of the channel output data associated with the visible light wavelength range and the plurality of channel crosstalk coefficients of the each channel and based on minimizing, under the pre-determined constraint, a second difference between the second image model and a second combination of a second part of the channel output data associated with the infra-red light wavelength range and the plurality of channel crosstalk coefficients of the each channel.

9. The apparatus of claim 8, wherein the pre-determined constraint comprises a constraint on an image gradient.

10. The apparatus of claim 8, wherein the calibration module is configured to generate the plurality of channel crosstalk coefficients in Fourier domain; and
wherein the image processor is configured to:
generate the pre-processed input data in the Fourier domain;
generate an image formation model in the Fourier domain; and
generate the channel output data for the each channel based on minimizing a difference between the image formation model in the Fourier domain and a combination of the channel output data and the plurality of channel crosstalk coefficients of the each channel in the Fourier domain under the pre-determined constraint.

11. The apparatus of claim 1, wherein each sensing unit of the plurality of sensing units comprises a first photodiode and a second photodiode forming a stack along a direction perpendicular to a light receiving surface of the each sensing unit.

12. The apparatus of claim 1, wherein each sensing unit of the plurality of sensing units comprises a single photodiode.

13. A method, comprising:
receiving input data generated by photodiodes of a plurality of sensing units responsive to incident light, wherein each sensing unit comprises one or more photodiodes, each of the one or more photodiodes being associated with a channel having a target wavelength range for photon-to-charge conversion;

obtaining, for each channel, a plurality of channel coefficients, the plurality of channel coefficients being configured to, when combined with the input data to generate channel output data for the each channel, increase a main component of the channel output data contributed by a part of the incident light within the target wavelength range of the each channel with respect to a crosstalk component of the channel output data contributed by a part of the incident light out of the target wavelength range, wherein the plurality of channel coefficients, when combined with a raw spectral response curve of each of the one or more photodiodes to obtain a target spectral response curve of the photodiode, maximizes a first portion of the target spectral response curve within the target wavelength range of each channel with respect to a second portion of the target spectral response curve out of the target wavelength range of each channel; and
generating, for the each channel, the channel output data based on combining the input data with the plurality of channel coefficients to reconstruct an image for the each channel.

14. The method of claim 13, further comprising:
obtaining data representing the raw spectral response curve of each photodiode of the photodiodes, the raw spectral response curve representing a spectral response of the each photodiode operating in the respective sensing unit to light of a wavelength range, the data representing the raw spectral response curves being combinable with the plurality of channel coefficients of the each channel to generate a target spectral response curve for the each channel; and
determining, for the each channel, a plurality of channel separation coefficients that maximizes a first portion of the target spectral response curve within the target wavelength range of the each channel with respect to a second portion of the target spectral response curve out of the target wavelength range of the each channel,
wherein the plurality of channel separation coefficients for the each channel is part of the plurality of channel coefficients for the each channel.

15. The method of claim 14, wherein the raw spectral response curve of each photodiode includes a first portion within the target wavelength of the channel associated with the each photodiode and a second portion out of the target wavelength out of the channel associated with the each photodiode;
wherein the method further comprises, for the each channel:
determining, for each raw spectral response of the raw spectral responses, a first portion that is within the target wavelength range of the each channel and a second portion that is outside the target wavelength range;
determining an in-band matrix based on correlations among the first portions of the raw spectral responses;
determining an out-of-band matrix based on correlations among the second portions of the raw spectral responses; and
determining the plurality of channel separation coefficients that increases a first combination of the in-band matrix and the plurality of channel separation coefficients with respect to a second combination of the out-of-band matrix and the plurality of channel separation coefficients.

16. The method of claim 15, wherein the first combination comprises a matrix multiplication of a transpose of the plurality of channel separation coefficients, the in-band matrix, and the plurality of channel separation coefficients; and wherein the second combination comprises a matrix multiplication of the transpose of the plurality of channel separation coefficients, the out-of-band matrix, and the plurality of channel separation coefficients.

17. The method of claim 16, wherein determining the plurality of channel coefficients comprises solving a generalized-Eigenvalue problem of maximizing a ratio between the first combination and the second combination.

18. The method of claim 17, further comprising:

determining, for the each channel, the target spectral response curve based on combining the raw spectral response curves with the plurality of channel coefficients of the each channel; and determining, for the each channel, a plurality of channel crosstalk coefficients that indicate crosstalk components of the channel output data of the each channel contributed by the plurality of photodiodes;

wherein the plurality of channel crosstalk coefficients of the each channel is determined based on minimizing a difference between the spectral response curve of the each channel and a combination of the plurality of channel crosstalk coefficients of the each channel and the target spectral response curves; and wherein the plurality of channel separation coefficients for the each channel is part of the plurality of channel coefficients for the each channel.

19. The method of claim 18, further comprising:

determining, based on the input data, a first image model associated with a visible light wavelength range and a second image model associated with an infra-red light wavelength range; and generating the channel output data for the each channel based on minimizing, under a pre-determined constraint, a first difference between the first image model and a first combination of a first part of the channel output data associated with the visible light wavelength range and the plurality of channel crosstalk coefficients of the each channel and based on minimizing, under the pre-determined constraint, a second difference between the second image model and a second combination of a second part of the channel output data associated with the infra-red light wavelength range and the plurality of channel crosstalk coefficients of the each channel.

20. A non-transitory computer readable medium storing instructions that, when executed by a hardware processor, causes the hardware processor to perform:

receiving input data generated by photodiodes of a plurality of sensing units responsive to incident light, wherein each sensing unit comprises one or more photodiodes, each of the one or more photodiodes being associated with a channel having a target wavelength range for photon-to-charge conversion;

obtaining, for each channel, a plurality of channel coefficients, the plurality of channel coefficients being configured to, when combined with the input data to generate channel output data for the each channel, increase a main component of the channel output data contributed by a part of the incident light within the target wavelength range of the each channel with respect to a crosstalk component of the channel output data contributed by a part of the incident light out of the target wavelength range, wherein the plurality of channel coefficients, when combined with a raw spectral response curve of each of the one or more photodiodes to obtain a target spectral response curve of the photodiode, maximizes a first portion of the target spectral response curve within the target wavelength range of each channel with respect to a second portion of the target spectral response curve out of the target wavelength range of each channel; and generating, for the each channel, the channel output data based on combining the input data with the plurality of channel coefficients to reconstruct an image for the each channel.

* * * * *